United States Patent [19]
Morita

[11] Patent Number: 4,760,825
[45] Date of Patent: * Aug. 2, 1988

[54] SYSTEM FOR CONTROLLING AN ENGINE AND METHOD THEREFOR

[75] Inventor: Tatsuo Morita, Yokosuka, Japan

[73] Assignee: Nissan Motor Company, Limited, Yokohama, Japan

[*] Notice: The portion of the term of this patent subsequent to Dec. 2, 2003 has been disclaimed.

[21] Appl. No.: 914,734

[22] Filed: Oct. 2, 1986

Related U.S. Application Data

[63] Continuation-in-part of Ser. No. 761,842, Aug. 2, 1985, Pat. No. 4,625,690.

[30] Foreign Application Priority Data

Aug. 3, 1984 [JP] Japan .............................. 59-163636
Aug. 6, 1984 [JP] Japan .............................. 59-164589
Aug. 8, 1984 [JP] Japan .............................. 59-121538

[51] Int. Cl.$^4$ ............................................. F02D 41/14
[52] U.S. Cl. ................................... 123/340; 123/350; 123/399; 123/435
[58] Field of Search ................. 123/340, 350, 399, 435

[56] References Cited

U.S. PATENT DOCUMENTS

| | | | |
|---|---|---|---|
| 4,319,658 | 3/1982 | Collonia et al. | 123/340 |
| 4,417,556 | 11/1983 | Latsch | 123/435 |
| 4,453,516 | 6/1984 | Filsinger | 123/340 |
| 4,461,254 | 7/1984 | Pfalzgraf et al. | 123/350 |
| 4,561,401 | 12/1985 | Hata et al. | 123/486 |
| 4,625,690 | 12/1986 | Morita | 123/340 |
| 4,640,249 | 3/1987 | Kawamura et al. | 123/425 |
| 4,658,787 | 4/1987 | Takizawa | 123/418 |
| 4,658,789 | 4/1987 | Morita | 123/422 |
| 4,660,535 | 4/1987 | Asano | 123/425 |

FOREIGN PATENT DOCUMENTS

| | | |
|---|---|---|
| 2952073 | 6/1981 | Fed. Rep. of Germany . |
| 3135479 | 3/1983 | Fed. Rep. of Germany . |
| 2102165 | 1/1983 | United Kingdom . |

Primary Examiner—Andrew M. Dolinar
Attorney, Agent, or Firm—Foley & Lardner, Schwartz, Jeffery, Schwaab, Mack, Blumenthal & Evans

[57] ABSTRACT

A system and method for controlling an engine, in which a value correlative to an engine output is detected, a target value of the engine output correlative value (preferably a pseudo value corresponding to an indicated mean effective pressure) is calculated on the basis of an angular displacement of an accelerator pedal and engine speed, the detected value correlative to the engine output is compared with the target value, an opening angle of a throttle valve located within a throttle chamber of the engine for adjusting an intake air quantity supplied to the engine according to its opening angle is calculated on the basis of the comparison result, and the throttle valve is actuated to adjust the intake air quantity according to the calculated opening angle so that the detected value correlative to the engine output coincides with the target value.

6 Claims, 28 Drawing Sheets

FIG.4

ACCELERATOR DEPRESSION ANGLE $\theta a \longrightarrow$ (deg)

| $\theta a$ / N | 0 | 5 | 10 | 20 | 30 | 40 | 50 | 60 |
|---|---|---|---|---|---|---|---|---|
| 600 | 10 | 12 | 14 | 20 | 26 | 30 | 34 | 40 |
| 1000 | 10 | 12 | 16 | 24 | 34 | 40 | 46 | 60 |
| 1500 | 10 | 14 | 18 | 30 | 42 | 50 | 58 | 70 |
| 2000 | 10 | 14 | 18 | 30 | 44 | 54 | 64 | 70 |
| 2500 | 10 | 14 | 20 | 32 | 44 | 56 | 66 | 70 |
| 3000 | 10 | 16 | 22 | 34 | 46 | 58 | 68 | 70 |
| 4000 | 10 | 16 | 22 | 34 | 46 | 58 | 68 | 70 |
| 6000 | 10 | 14 | 16 | 28 | 40 | 48 | 58 | 65 |

ENGINE SPEED  N $\downarrow$ (rpm)

BASIC TARGET VALUE OF CYLINDER PRESSURE MAXIMUM VALUE    Pmo  (kg/cm$^2$)

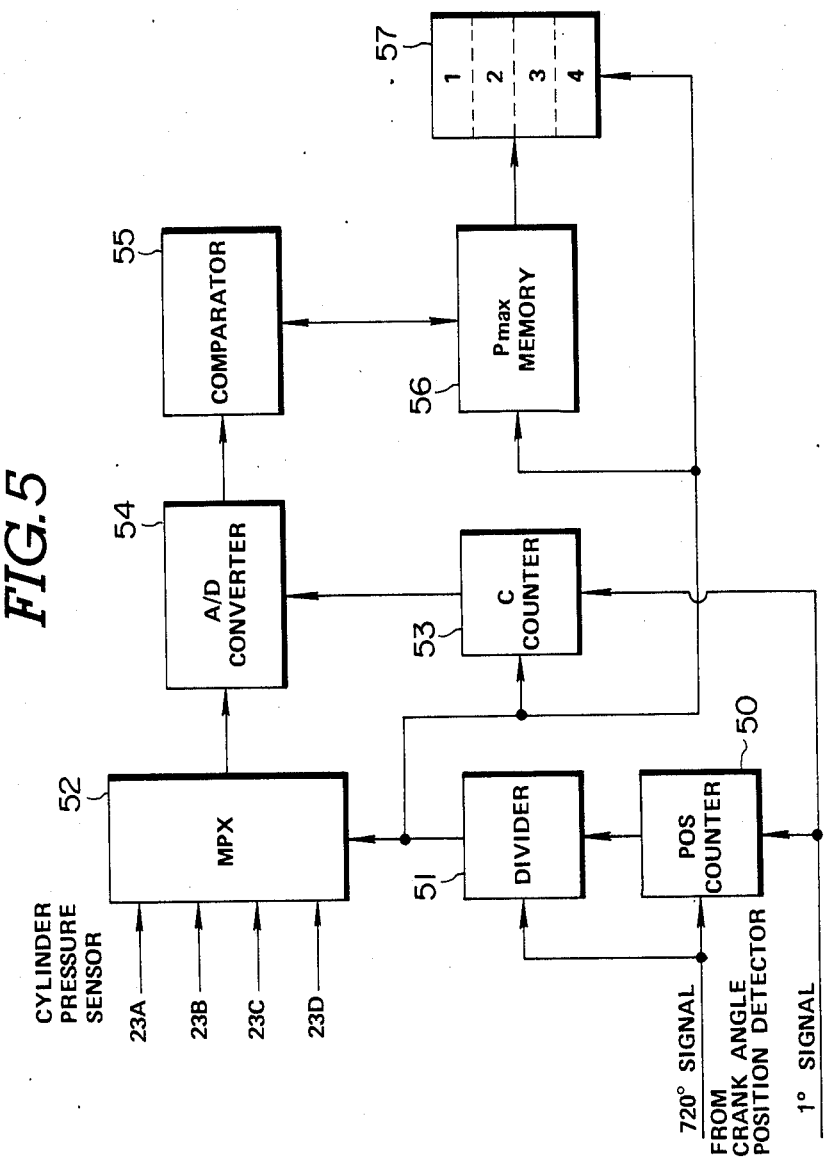

FIG. 10

ACCELERATOR DEPRESSION ANGLE  $\theta a \longrightarrow$ (deg)

ENGINE SPEED  $N \downarrow$ (rpm)

| $\theta a$ / N | 0 | 5 | 10 | 20 | 30 | 40 | 50 | 60 |
|---|---|---|---|---|---|---|---|---|
| 600 | 2 | 2.4 | 2.8 | 4.0 | 5.2 | 6.0 | 6.8 | 8.0 |
| 1000 | 2 | 2.4 | 3.2 | 4.8 | 6.8 | 8.0 | 9.2 | 12.0 |
| 1500 | 2.1 | 2.8 | 3.6 | 6.0 | 8.4 | 10.0 | 11.6 | 14.0 |
| 2000 | 2.1 | 2.8 | 3.6 | 6.0 | 8.8 | 10.8 | 12.8 | 14.0 |
| 2500 | 2.1 | 2.8 | 4.0 | 6.4 | 8.8 | 11.2 | 13.2 | 14.0 |
| 3000 | 2.1 | 3.0 | 4.2 | 6.4 | 9.2 | 11.6 | 13.6 | 14.0 |
| 4000 | 2.1 | 3.1 | 4.2 | 6.8 | 9.2 | 11.6 | 13.6 | 14.0 |
| 6000 | 2.1 | 2.8 | 3.2 | 5.6 | 8.0 | 9.6 | 11.6 | 13.0 |

BASIC TARGET VALUE OF INDICATED MEAN EFFECTIVE PRESSURE  $Pio$  (kg/cm$^2$)

FIG.13

ACCELERATOR DEPRESSION ANGLE    θa ⟶ (deg)

| θa / N | 0 | 5 | 10 | 20 | 30 | 40 | 50 | 60 |
|---|---|---|---|---|---|---|---|---|
| 600 | 0 | 8 | 15 | 30 | 45 | 60 | 75 | 90 |
| 1000 | 0 | 9 | 17 | 33 | 50 | 63 | 76 | 90 |
| 1500 | 0 | 10 | 18 | 36 | 55 | 66 | 78 | 90 |
| 2000 | 0 | 10 | 20 | 40 | 60 | 70 | 80 | 90 |
| 2500 | 0 | 10 | 20 | 40 | 60 | 70 | 80 | 90 |
| 3000 | 0 | 10 | 20 | 40 | 60 | 70 | 80 | 90 |
| 4000 | 0 | 10 | 20 | 40 | 60 | 70 | 80 | 90 |
| 6000 | 0 | 9 | 17 | 35 | 50 | 65 | 75 | 90 |

ENGINE SPEED   N ↓ (rpm)

BASIC THROTTLE VALVE OPENING ANGLE    θtmo    (deg)

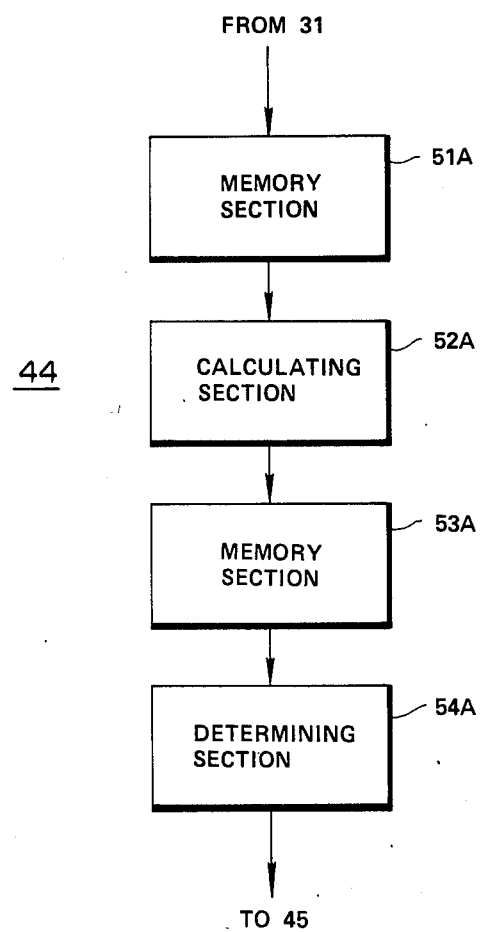

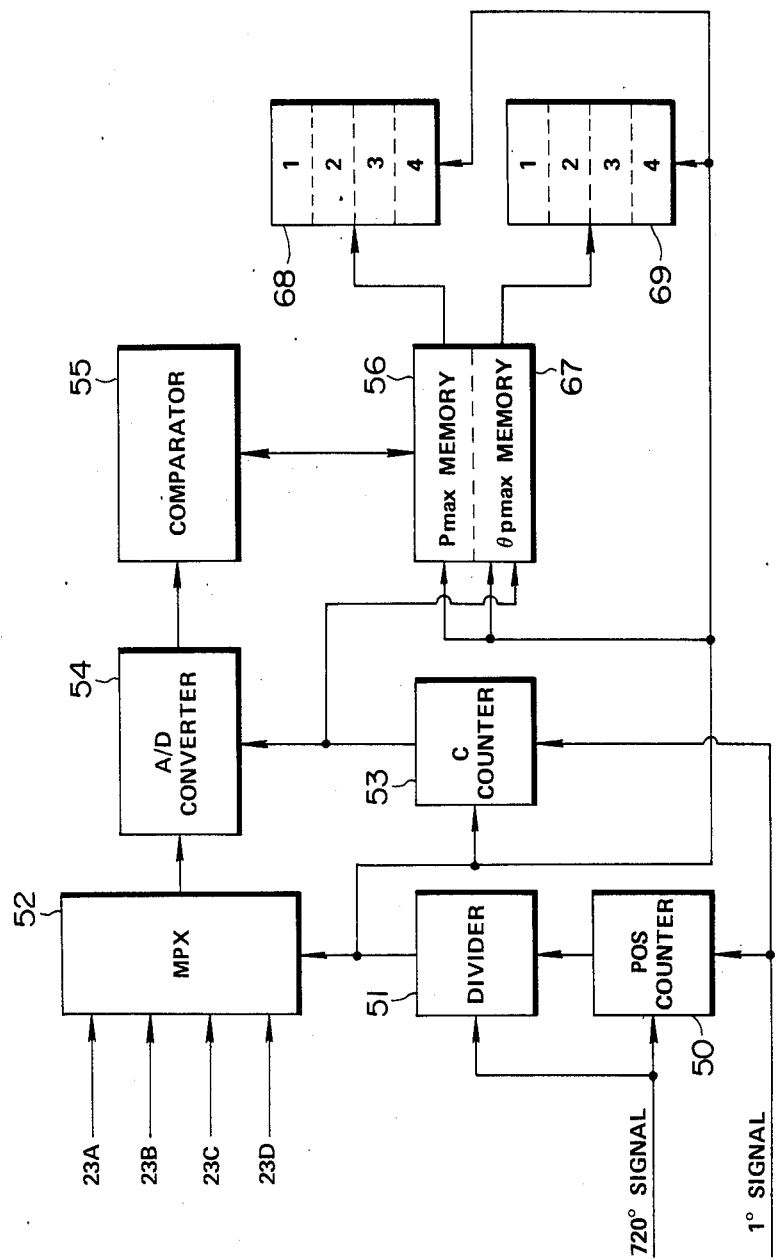

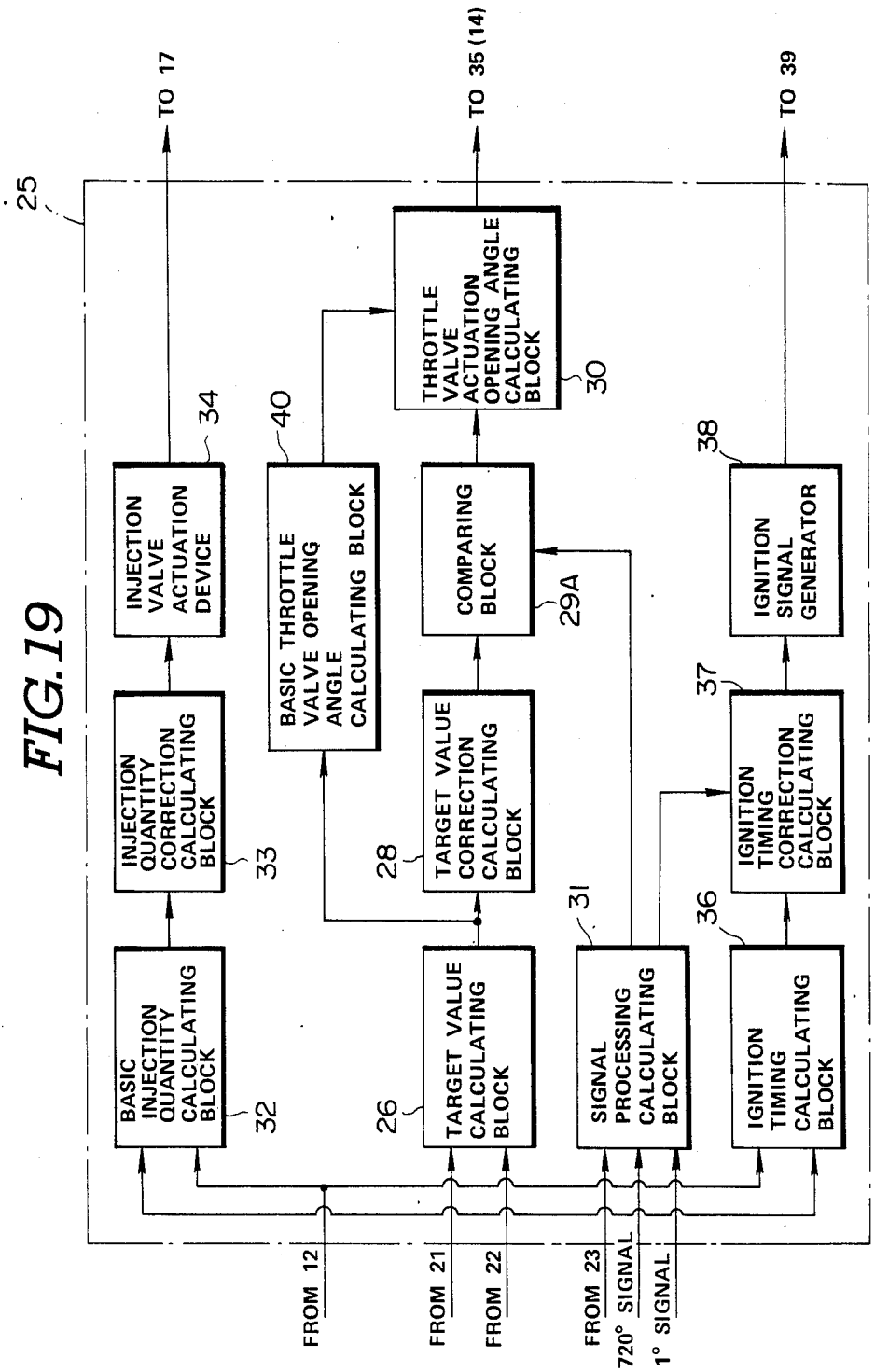

1 CYLINDER

3 CYLINDER

4 CYLINDER

2 CYLINDER

FIG.26

ACCELERATOR DEPRESSION ANGLE  θa ⟶ (deg)

| θa / N | 0 | 5 | 10 | 20 | 30 | 40 | 50 | 60 |
|---|---|---|---|---|---|---|---|---|
| 600 | 2 | 2.4 | 2.8 | 4.0 | 5.2 | 6.0 | 6.8 | 8.0 |
| 1000 | 2 | 2.4 | 3.2 | 4.8 | 6.8 | 8.0 | 9.2 | 12.0 |
| 1500 | 2.1 | 2.8 | 3.6 | 6.0 | 8.4 | 10.0 | 11.6 | 14.0 |
| 2000 | 2.1 | 2.8 | 3.6 | 6.0 | 8.8 | 10.8 | 12.8 | 14.0 |
| 2500 | 2.1 | 2.8 | 4.0 | 6.4 | 8.8 | 11.2 | 13.2 | 14.0 |
| 3000 | 2.1 | 3.0 | 4.2 | 6.4 | 9.2 | 11.6 | 13.6 | 14.0 |
| 4000 | 2.1 | 3.1 | 4.2 | 6.8 | 9.2 | 11.6 | 13.6 | 14.0 |
| 6000 | 2.1 | 2.8 | 3.2 | 5.6 | 8.0 | 9.6 | 11.6 | 13.0 |

ENGINE SPEED  N ↓ (rpm)

BASIC TARGET VALUE OF PSEUDO VALUE Pi      Pio  (kg/cm²)

SYSTEM FOR CONTROLLING AN ENGINE AND METHOD THEREFOR

CROSS REFERENCE TO THE RELATED APPLICATION

The present application is Continuation-in-Part application of the co-pending U.S. patent application Ser. No. 761,842 filed on Aug. 2, 1985, now U.S. Pat. No. 4,625,690 entitled A SYSTEM FOR CONTROLLING AN ENGINE AND METHOD THEREFOR.

BACKGROUND OF THE INVENTION

1. Field of the Invention

The present invention relates generally to a system and method for controlling an engine wherein a value correlative to an output generated from the engine is detected and an engine control parameter such as an engine throttle valve, an opening angle of which determines an intake air quantity, is actuated so that the detected value reaches a target value, preferably wherein in addition to the actuation of the throttle valve to control intake air quantity an air-fuel mixture ratio is controlled so that the engine output reaches near a limit value in a stable region previously set, and preferably wherein in addition to the actuation of the throttle valve an ignition timing is so controlled that the engine output reaches a maximum.

2. Description of the Prior Art

In a conventional gasoline engine, an accelerator pedal is mechanically linked with a throttle valve installed within an engine intake manifold. An angular position of the accelerator pedal (when an operator depresses the pedal) determines an opening angle of the throttle valve, i.e., an intake air quantity supplied to the engine, so that the engine output is directly controlled.

In detail, in a conventional electronically controlled engine, an optimum quantity of fuel injected into the engine is previously set according to the intake air quantity thus determined, an engine speed, various engine operating parameters such as engine cooling temperature. A plurality of fuel injection valves, each located within a corresponding intake port of the corresponding engine cylinder, which is located downstream of the throttle valve, inject fuel wherein the quantity of fuel is determined by the optimum quantity of fuel previously set, so that a mixture of fuel with intake air is formed and supplied to the engine body. Thus, the engine operation may be controlled.

Since in such conventional engine control systems the quantity of fuel supplied to the engine is controlled on the basis of the actual quantity of intake air determined according to the opening angle of the throttle valve, i.e., the angular position of the accelerator pedal, the engine output is varied even with the same throttle valve opening angle depending on the difference of environment under which the engine is placed (, e.g., atmospheric pressure and surrounding air temperature of the engine).

For example, when the above-described engine is placed on high ground, i.e., under a low atmospheric pressure, intake air quantity is reduced so that the quantity of fuel injected into the engine is accordingly reduced. Thus the engine output is reduced, even though the opening angle of the throttle valve is the same as that when the engine is placed on low ground, i.e., under a normal atmospheric pressure.

Therefore, it is necessary to depress the accelerator pedal through an angle greater than that when the engine is placed at low ground in order to achieve the same engine output as that when the engine is placed at low round. In this way, engine driveability is lowered.

In a similar way, the variation in the engine output is caused by aging effects even though the opening angle of the throttle valve is the same so that the engine driveability will be lowered.

Furthermore, since a deviation of the engine output from a target value means that the engine output is deviated from a stable region in which the engine carries out a stable operation, the engine cannot provide a sufficient engine output and it results in a wasteful consumption of fuel when the engine output is out of the stable region.

SUMMARY OF THE INVENTION

With the above-described problems in mind, it is an object of the present invention to provide an engine control system and method which ensures stable driveability irrespectively of influences of a difference in environment under which the engine is placed and irrespective of aging effects. To achieve the object, the engine control system and method detect a value correlative to the engine output and control an engine control parameter so that the detected value matches with a target value determined on the basis of an engine operating condition.

In addition, it is another object of the present invention to provide the engine control system and method, in which an opening angle of an engine throttle valve is controlled so that the detected value correlative to the engine output matches with a target value determined on the basis of the angular position of the accelerator pedal and engine speed and an air-fuel mixture is controlled so that the engine output falls in the vicinity of a limit value within a stable region of engine operation, thus ensuring a stable driveability and a favorable air-fuel mixture ratio.

Furthermore, it is still another object of the present invention to provide the engine control system and method, in which the opening angle of the throttle valve is controlled so that the detected value correlative to the engine output matches with a target value determined on the basis of the angular position of the accelerator pedal and engine speed and in which an ignition timing is controlled so as to produce a maximum output torque of the engine, thus ensuring a stable driveability and favorable air-fuel mixture ratio.

These other objects can be achieved by providing a system for controlling an engine, comprising: (a) first means for adjusting an intake air quantity supplied to the engine according to an opening angle thereof, (b) second means for actuating the first means to adjust the opening angle according to an angular displacement thereof, (c) third means for detecting a characteristic value correlative to an engine output, (d) fourth means for detecting the angular displacement of the second means, (e) fifth means for detecting an engine speed, (f) sixth means for calculating a target value of the engine output correlative value from the angular displacement of the second means and engine speed detected by the fourth and fifth means, (g) seventh means for comparing the calculated target value of the engine output correlative value by the sixth means with the detected value of engine output correlative value by the third means, (h) eighth means for calculating the opening angle value of the first means on the basis of a comparison result of the seventh means, and (i) ninth means for further actuating the first means to adjust the opening angle of the first means according to the calculated opening angle of the eighth means in addition to the adjustment of the opening angle of the first means by means of the second means so that the detected value of the engine output correlative value by the third means coincides with the calculated target value thereof by the sixth means.

BRIEF DESCRIPTION OF THE DRAWINGS

A more complete understanding of the present invention may be obtained from the following detailed description taken in conjunction with the attached drawings in which like reference numerals designate corresponding elements and in which:

FIG. 4 is an explanatory view of a table used for the control unit shown in FIG. 1 to read a basic target value $P_{mo}$ of a maximum value of pressure in an engine cylinder;

FIG. 5 is a simplified circuit block diagram of means for detecting $P_{max}$ from a pressure sensor located on each engine cylinder shown in FIG. 1;

FIG. 10 is an explanatory view for explaining a table used for the microcomputer to read a basic target value $P_{io}$ of the indicated mean effective pressure;

FIG. 13 is an explanatory view for explaining a table used for the control unit shown in FIG. 11 to read a basic throttle valve opening angle $\theta_{tmo}$;

FIG. 16 is a simplified circuit block diagram of a stability detecting block shown in FIG. 14 of the control unit;

FIG. 17 is a simplified circuit block diagram of a signal processing calculating block shown in FIG. 14 of the control unit;

FIG. 19 is a yet still another functional block diagram of the control unit in a fourth preferred embodiment;

FIG. 26 is an explanatory view for explaining a table used for the microcomputer to read a basic target value $P_{io}$ correlative to the indicated mean effective pressure.

DETAILED DESCRIPTION OF THE PREFERRED EMBODIMENTS

Reference will hereinafter be made to the attached drawings in order to facilitate understanding of the present invention.

Figure 1:
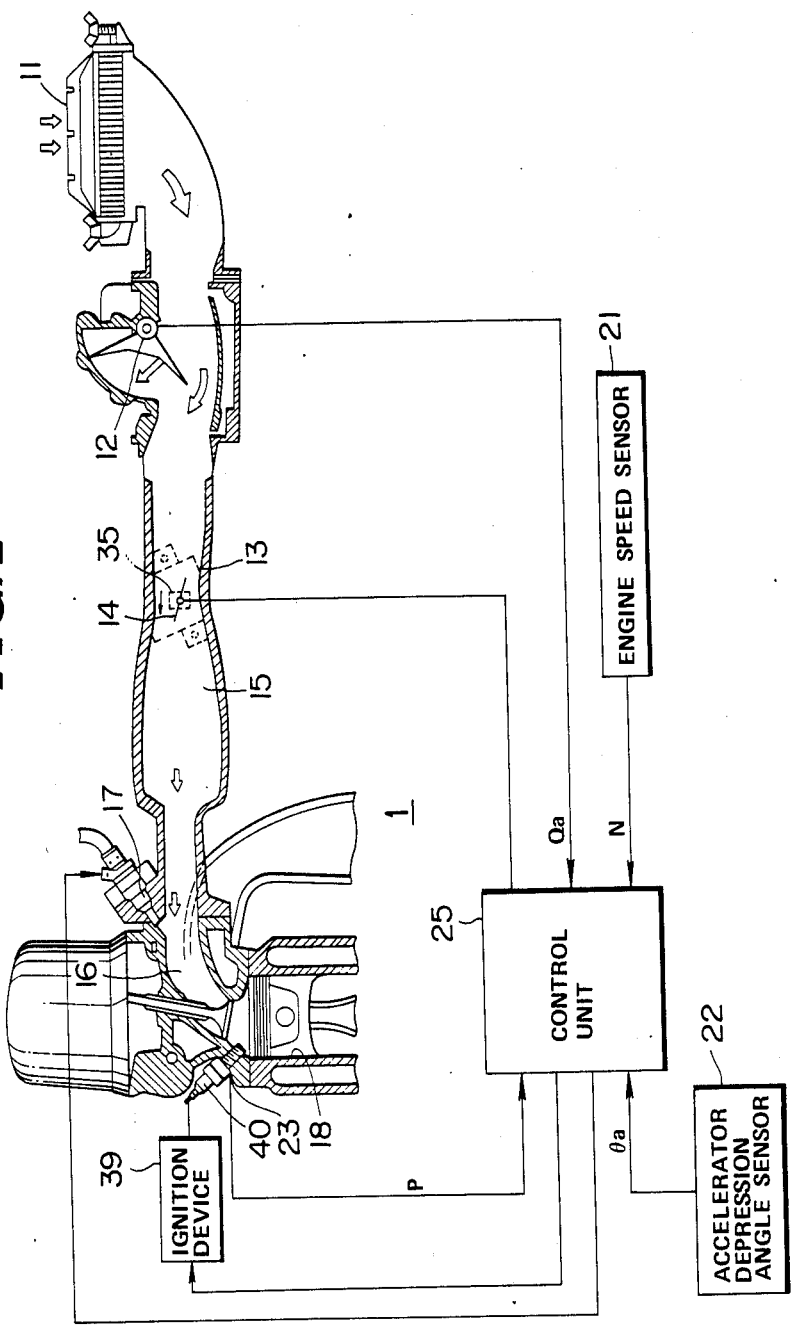
FIG. 1 is a simplified block diagram of an engine control system mounted in a vehicular engine.

FIG. 1 shows a circuit configuration of an engine control system according to the present invention which is applicable to an engine with an electronically controlled fuel injection system.

In FIG. 1, air outside of an engine 1 is first passed through an air cleaner 11 to remove dust contained in the air into an intake manifold 15 of the engine 1.

An airflow meter 12 measures an intake air quantity $Q_a$. A throttle valve 14 installed within a throttle chamber 13 controls the intake air quantity $Q_a$ according to its opening angle.

Air entered in the intake manifold 15 forms an air-fuel mixture with fuel injected through a fuel injection valve 17 installed within an intake port downstream of the throttle chamber 13. The air-fuel mixture is thereafter supplied to a combustion chamber of each cylinder 18.

In FIG. 1, numeral 21 denotes an engine speed sensor for detecting an engine speed N. The engine speed sensor 21 detects the engine speed on the basis of a revolution angle of an engine crankshaft.

Numeral 22 denotes an acceleration depression angle sensor for detecting an annular position $\theta_a$ of an accelerator pedal and for outputting a signal in proportion to the angular position of the accelerator pedal.

Numeral 23 denotes a cylinder pressure sensor for detecting inner air pressure P in each engine cylinder (or alternatively a particular cylinder). The pressure sensor 23 comprises a piezoelectric element in a form of a washer attached to a spark plug 40. The structure of the pressure sensor 23 is exemplified by U.S. patent application Ser. No. 574,693 filed on Jan. 24, 1984 and issued as U.S. Pat. No. 4,524,625. The contents of the U.S. Patent is hereby incorporated by reference.

Numeral 35 denotes a throttle valve actuation device comprising a step motor and angle sensor for angularly displacing the throttle valve on the basis of a drive signal derived from a control unit 25 to be described later.

The control unit 25 outputs drive signals to the throttle valve actuation device 35 and injection valve 17 on the basis of the input signals from the sensors 21, 22, and 23. Numeral 39 denotes an ignition device to be escribed later.

Figure 2:
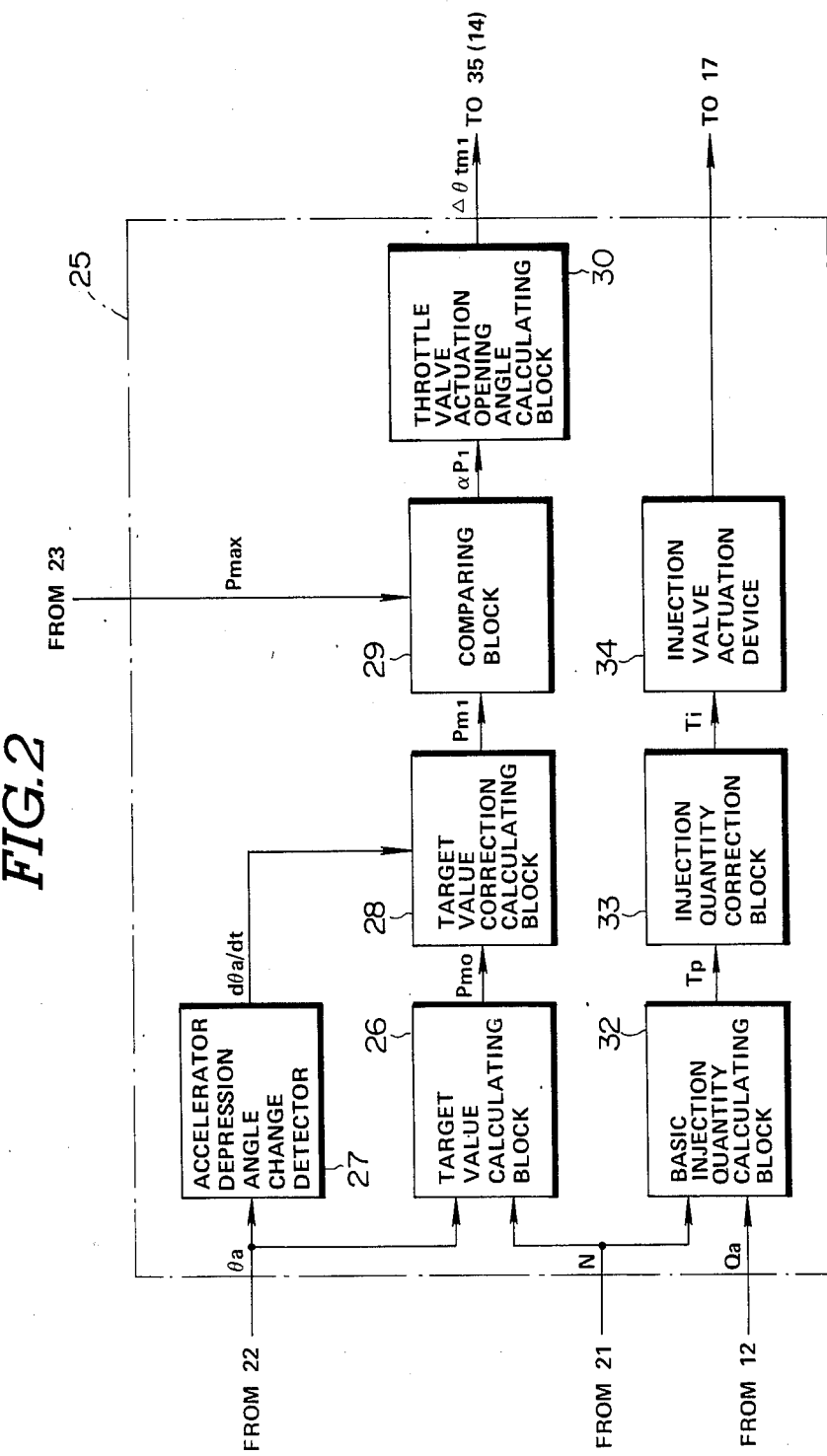
FIG. 2 is a functional block diagram of a control unit shown in FIG. 1 in a first preferred embodiment.

FIG. 2 shows a functional block diagram of the control unit 25 in a first preferred embodiment.

In FIG. 2, numeral 26 denotes a target value calculating block for calculating a basic target value (to be described later) according to the current engine operating condition from the engine revolutional speed V detected by the engine revolutional speed sensor 21 and acceleration opening angle $\theta_a$ detected by the accelerator (pedal) depression angle sensor 22. The target value calculating block 26 obtains the basic target value through the calculation or through a table look up technique.

The basic target value described above is, in this embodiment, a basic target value $P_{mo}$ of a maximum value of the cylinder pressure. The basic target value $P_{mo}$ is previously stored and is read from a table shown in FIG. 4 in this embodiment.

Numeral 28 denotes a target value correction calculating block.

The basic target value $P_{mo}$ is corrected with various engine operating variables such as an engine cooling water temperature. A final target value $P_{m1}$ is calculated in the block 28 from the following equation.

$$P_{m1} = \alpha_{mw} \times \alpha_m \times P_{mo}, \quad (1)$$

wherein $\alpha_{mw}$ and $\alpha_m$ are correction coefficients and as the values of $\alpha_{mw}$ and $\alpha_m$ are increased, the target value of $P_{mo}$ is incrementally corrected.

The correction coefficient $\alpha_{mw}$ in equation (1) is an incremental correction coefficient during the engine warm-up operation by which fuel is increased and is calculated from the following equation.

$$\alpha_{mw} = K_{mw} \times F_t \times K_{adv}, \quad (2)$$

wherein $K_{mw}$ is a constant number.

In the equation (2), $F_t$ denotes a correction coefficient for increasing the amount of fuel supplied to the engine in inverse proportion to the engine cooling water temperature and $K_{adv}$ is a correction coefficient for retarding an ignition timing when the engine cooling water temperature is lower than a normal temperature during engine warm-up operation. Therefore, the incremental correction coefficient $\alpha_{mw}$ permits the promotion of engine warm-up.

On the other hand, $\alpha_m$ is a correction coefficient during a transient operation of the engine, the value of the correction coefficient $\alpha_m$ being changed according to a rate of change in the depression angle of the accelerator pedal.

The correction coefficient $\alpha_m$ is calculated in the following equation (3) on the basis of a value $d\theta_a/dt$ since the accelerator pedal depression angle change detector 27 detects a change of the depression angle with respect to time ($d\theta_a/dt$).

$$\alpha_m = 1 + K_m \times d\theta_a/dt \quad (3)$$

($K_m$ is a constant number)

The value of correction coefficient $\alpha_m$ is increased during the start of acceleration and is decreased during the start of deceleration.

Therefore, the responsiveness of the engine performance is improved during a transient state due to the correction coefficient $\alpha_m$.

Numeral 29 denotes a comparing block for comparing the above-described target value $P_{m1}$ with a maximum value $P_{max}$ of the cylinder pressure detected by the cylinder pressure sensor 23 and calculating a ratio $\alpha_{p1}$ in the following equation (4).

$$\alpha_{p1} = P_{m1}/P_{max} \quad (4)$$

A subsequent throttle valve actuation opening angle calculating block 30 calculates an opening angle $\theta_{tm1}$ in the following equation (5) from the ratio $\alpha_{p1}$.

$$\theta_{tm1a} = K_{t1} \times \alpha_{p1} \times \theta_{tm1b} \quad (5)$$

($K_{t1}$ is a constant number)

In the equation (5), $\theta_{tm1}$ is calculated whenever a predetermined time has elapsed (for example, whenever the engine crankshaft has rotated through a predetermined angle, e.g., 360°). In addition, $\theta_{tm1b}$ denotes the opening angle of the throttle valve calculated at the previous time and $\theta_{tm1a}$ denotes the opening angle of the throttle valve calculated at the present time.

From these calculated values $\theta_{tm1a}$, $\theta_{tm1b}$, the throttle valve actuation opening angle $\Delta\theta_{tm1}(=\theta_{tm1a}-\theta_{tm1b})$ is calculated.

The throttle valve actuation device 35 actuates the throttle valve 14 according to the calculated opening angle $\Delta\theta_{tm1}$.

The basic injection quantity calculating block 32 calculates a basic pulsewidth $T_p (= K \times Q_a/N$, wherein K is a constant number) from the intake air quantity $Q_a$ detected by the air flow meter 12 and engine revolutional speed N by the engine speed sensor 21.

An injection quantity correction calculating block 33 receives various information on conditions of the engine and various parts of the vehicle, corrects the pulsewidth $T_p$, and obtains an actual injection pulsewidth $T_i$.

The actual injection pulse width $T_i$ corresponds to a duration for which the injection valve opens. The injection valve actuation device 34 actuates all injection valves 17 in all cylinders simultaneously once for one engine revolution.

Next, FIG. 5 shows a specific circuit configuration for detecting the maximum value $P_{max}$ of the cylinder pressure applicable to a four-cylinder engine. The crank angle position sensor (not shown in FIG. 5) produces 720° signal and 1° signal in synchronization with the engine revolution speed. The period of 720° signal corresponds to a crank angle required for each cylinder to carry out four strokes in the four-cylinder engine. The period of 1° signal corresponds to two degrees of the crank angle.

In FIG. 5, numeral 50 denotes a crank angle position counter (POS counter) for indicating a crank angle position. The POS counter 50 is reset in response to a rising edge of the 720° signal and is incremented by one whenever the 1° signal rises and falls.

Figure 7:
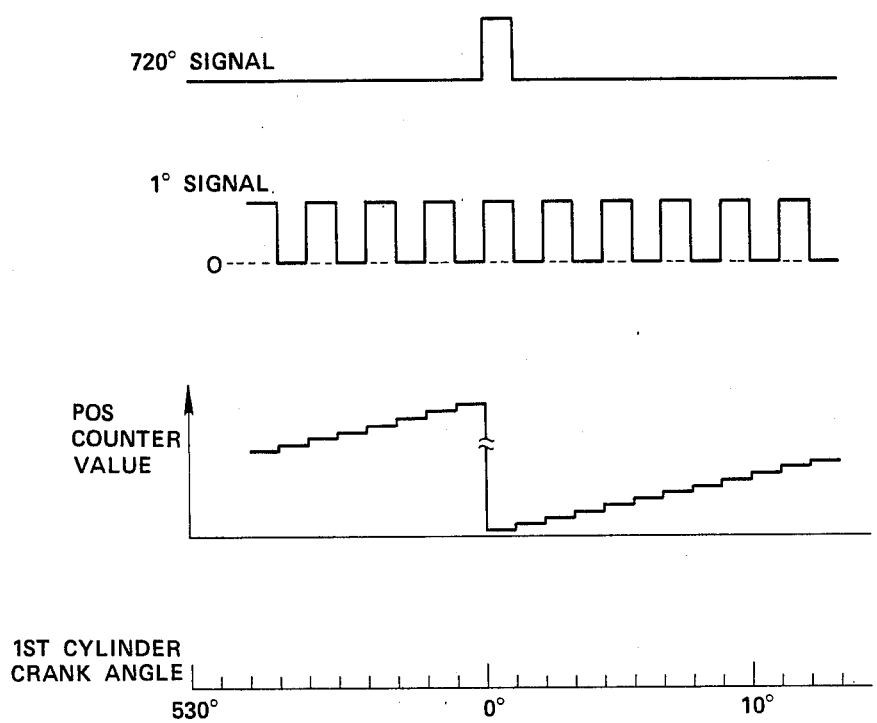
FIG. 7 is a timing chart for explaining each output signal of circuit blocks shown in FIG. 5.

It should be noted that the 720° signal rises in a top dead center in a compression stroke of a first cylinder when an ignition order of the four-cylinder engine is set as 1-3-4-2 (refer to FIG. 7).

Numeral 51 denotes a frequency divider which is reset to 1 in response to the rising edge of the 720° signal and increments a count value by one when the count value of the POS counter 50 becomes a multiple of 180.

Numeral 52 denotes a multiplexor (MPX) which receives each pressure signal from the pressure sensors 23A, 23B, 23C, and 23D installed in each cylinder and changes output signals in synchronization with the output values of the divider 51. That is to say, the pressure signal of the first cylinder is outputted when the output value of the divider 51 is 1, the pressure signal of the third cylinder is outputted when the output value of the divider is 2, that of fourth cylinder when it is 3, and that of second cylinder when it is 4.

Numeral 53 denotes a C counter for indicating a crank angle position after the top dead center in the compression stroke of each engine cylinder. Whenever the output value of the divider 51 is changed, the C counter 53 is reset and is incremented by one whenever the 1° signal falls and rises.

Numeral 54 denotes an analog-to-digital converter (A/D converter) which converts the output signal of the multiplexer 52 into the corresponding digital signal whenever the count value of the C counter 53 changes.

Numeral 55 denotes a comparator which compares the digitally converted pressure value P with the memory value of $P_{max}$ stored in the memory $P_{max}$ 56. In the memory $P_{max}$ 56, the maximum pressure value $P_{max}$ 56 is updated to a new $P_{max}$ memory value only when the pressure value P is greater than the maximum pressure value $P_{max}$. That is to say, in the $P_{max}$ memory 56, a greater pressure value P is replaced with the currently stored pressure value P. Thus the $P_{max}$ memory 56 stores a maximum value $P_{max}$ of the cylinder pressure in an expansion stroke. It should be noted tha the $P_{max}$ memory value of the $P_{max}$ memory 56 is cleared whenever the output value of the divider 51 is changed so that the value of $P_{max}$ for each cylinder is stored.

The $P_{maxi}$ memory 57 is a memory for storing a memory value $P_{max}$ for each cylinder. The updating of the memory value is carried out when the output value of the divider 51 is changed. Prior to the clear operation, the memory value of $P_{max}$ stored in the $P_{max}$ memory 56 is sequentially stored. That is to say, if the value of $P_{max}$ in an i order cylinder is expressed by $P_{maxi}$ (wherein i=1 through 4), the $P_{maxi}$ memory 57 stores the values of $P_{max1}$, $P_{max3}$, $P_{max4}$, and $P_{max2}$ sequentially for each output value of the divider 51 in order as 1, 2, 3, and 4.

The maximum pressure value $P_{max}$ of each cylinder detected in the above-described way can be detected in the same way by means of a microcomputer.

The microcomputer constituting the control unit 25 comprises: a Central Processing Unit (CPU); a Random Access Memory (RAM); a Read-Only Memory (ROM); and an I/O Port.

Figure 6A:
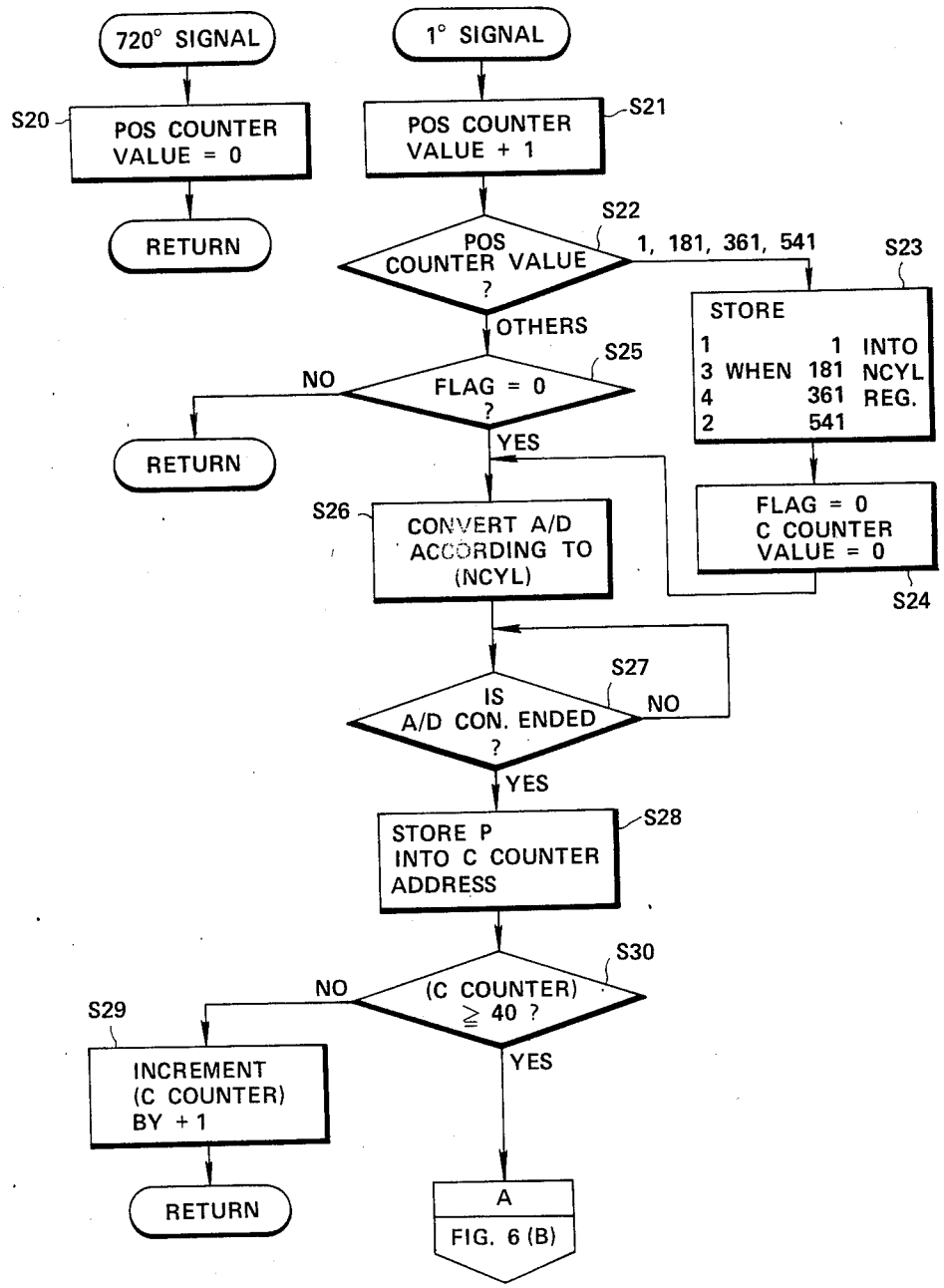
FIGS. 6(A) and 6(B) are an integrally operational flowchart for detecting $P_{max}$ on which the microcomputer executes in place of the specific circuit configuration shown in FIG. 5.
Figure 6B:
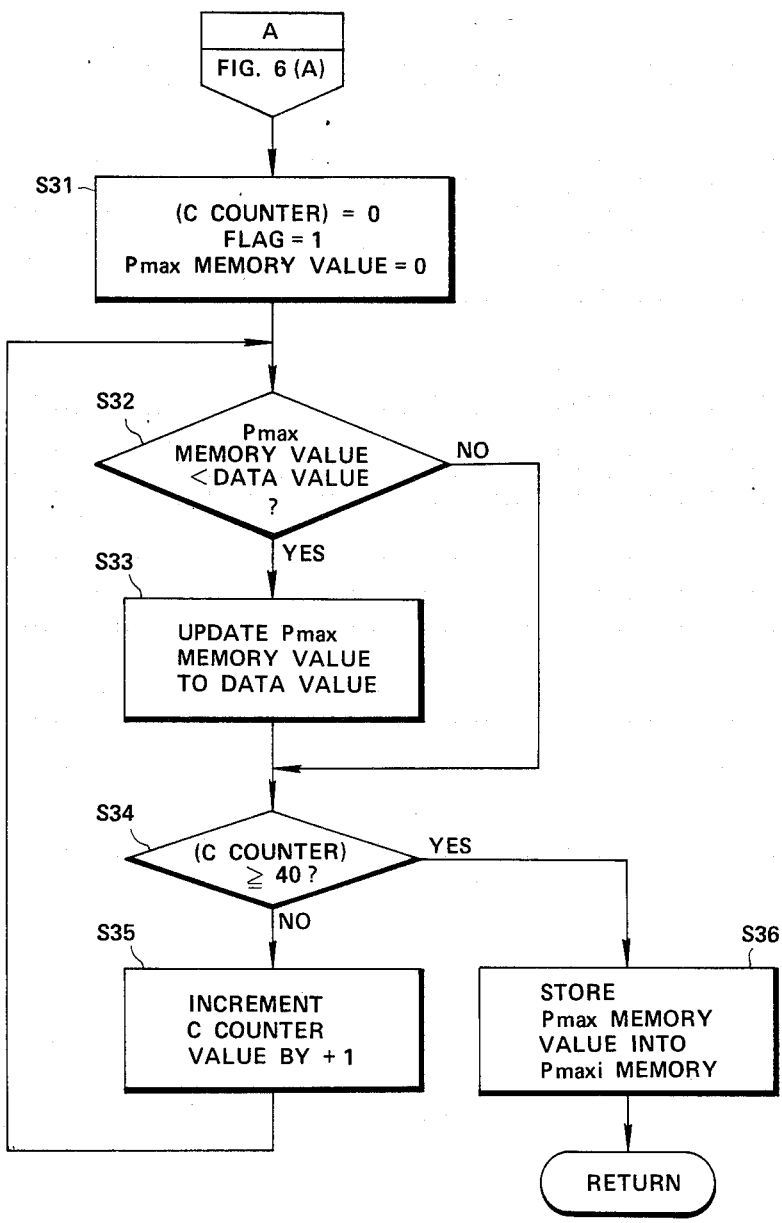

FIGS. 6(A) and 6(B) show an integrally operational flowchart of the microcomputer for detecting the maximum pressure value $P_{max}$.

The operational flowchart shown in FIGS. 6(A) and 6(B) is divided into two routines: a program which is executed whenever the crank angle has rotated through 720°, i.e., in synchronization with the 720° signal; and a program which is executed whenever the crank angle has rotated through 1°, i.e., in synchronization with the 1° signal.

It should be noted that an execution timing is synchronized with a signal from an engine crankshaft angular position detector of the engine (not shown).

The 720° signal rises at the top dead center in the compression stroke in the first cylinder as described above. Thus, the program shown in FIG. 6(A) in synchronization with the 720°-signal is executed. That is to say, the count value of the POS counter is cleared whenever the 720° signal rises in a step S20 shown in FIG. 6(A). It should be noted that the 720°-signal synchronized program has a priority higher than the 1°-signal synchronized program.

The 1°-signal synchronized program shown in FIGS. 6(A) and 6(B) is executed whenever the engine crankshaft has rotated through 180° since any one of the engine cylinder pistons has reached its top dead center (TDC) in the compression stroke whenever the crankshaft has rotated through 180° in the four-cylinder engine. Furthermore, since the crank angle position at which the maximum pressure value $P_{max}$ is generated ranges within 40° with respect to the top dead center in the compression stroke, the pressure value P is detected whenever the 1° signal is received until the crank angle position reaches 39° after the top dead center in each compression stroke and is stored as the data value. Thereafter, the maximum value $P_{max}$ is selected from the data values stored.

Specifically, the top dead center in the compression stroke of each engine cylinder corresponds to 1, 181, 361, and 541 of the count values of the POS counter. When the count values of the POS counter indicate 1, 181, 361, and 541, respectively, a flag (FLAG) which indicates start of the detection of P is turned to 0 and the C counter is cleared in steps S22 and 24. It should be noted that the POS counter 50 starts counting in response to the rising edge of the 1° signal immediately after the reset signal (720° signal) is received.

It should be noted that since the POS counter 50 in the microcomputer starts counting in response to the rising edge of the 1° signal immediately after the reset signal (720° signal) is received, the value of POS counter is deviated by one at the top dead center in each compression stroke (refer to FIG. 7) of the engine cylinders.

It should also be noted that FLAG is a flag indicating to determine whether an analog value from the pressure sensor 23A through 23D or 23 should be converted to the digital value and the A/D conversion should be carried out when the FLAG indicates 1.

In a steps 23, if the ignition order for the four-cylinder engine cylinders is 1-3-4-2, the determination of cylinder number is possible at the same time when the detection of the top dead center (TDC) is carried out. When the count value of the POS counter indicates 1, 181, 361, and 541, a cylinder numbers 1, 3, 4, and 2 are stored in the cylinder number register (NCYL register) (in a step S23). In this way, if the top dead center in the compression stroke of the particular engine cylinder is determined, the pressure signal of the pressure sensor of each engine cylinder selects a channel of the A/D converter to carry out the A/D conversion and the value of P is stored in a register of the C counter address (corresponds to the count value of the C counter) in steps S26 through S28.

The storage operation of the value P is continued until the crank angle position reaches 39° after the top dead center in the compression stroke. When the crank angle position reaches 40° after the top dead center in the compression stroke, the routine goes to a step S30 in which the determination of $P_{max}$ is carried out.

Next, after the memory value $P_{max}$ of the $P_{max}$ memory is once turned to "0" in order to determine the maximum value of $P_{max}$ in a step S31, the routine goes to a step S32 wherein the value of the $P_{max}$ in the $P_{max}$ memory is compared with the data value of the C counter address and the $P_{max}$ memory value is updated to the data value if the data value is greater than the C counter address data value.

In a step S33, one of the values $P_{max}$ which indicates the maximum is stored in the $P_{max}$ memory. The value $P_{max}$ is transferred to the $P_{maxi}$ memory after detection of $P_{max}$ in a step S36. It is noted that symbol i denotes the number of cylinder to be stored in the NCYL register and $P_{maxi}$ denotes the maximum value of the cylinder number of i.

Consequently, the maximum value $P_{max}$ thus obtained is outputted from the comparing block 29 shown in FIG. 2.

It should be noted that an indicated mean effective pressure $P_i$ can be utilized in place of the maximum pressure value $P_{max}$. For example, if the cylinder pressure P is detected in the vicinity of the top dead center in the compression stroke in which the amount of work is greatest in one engine cycle, a value corresponding to $P_i$ for each cylinder in a time sharing mode may be adapted.

Figure 8:
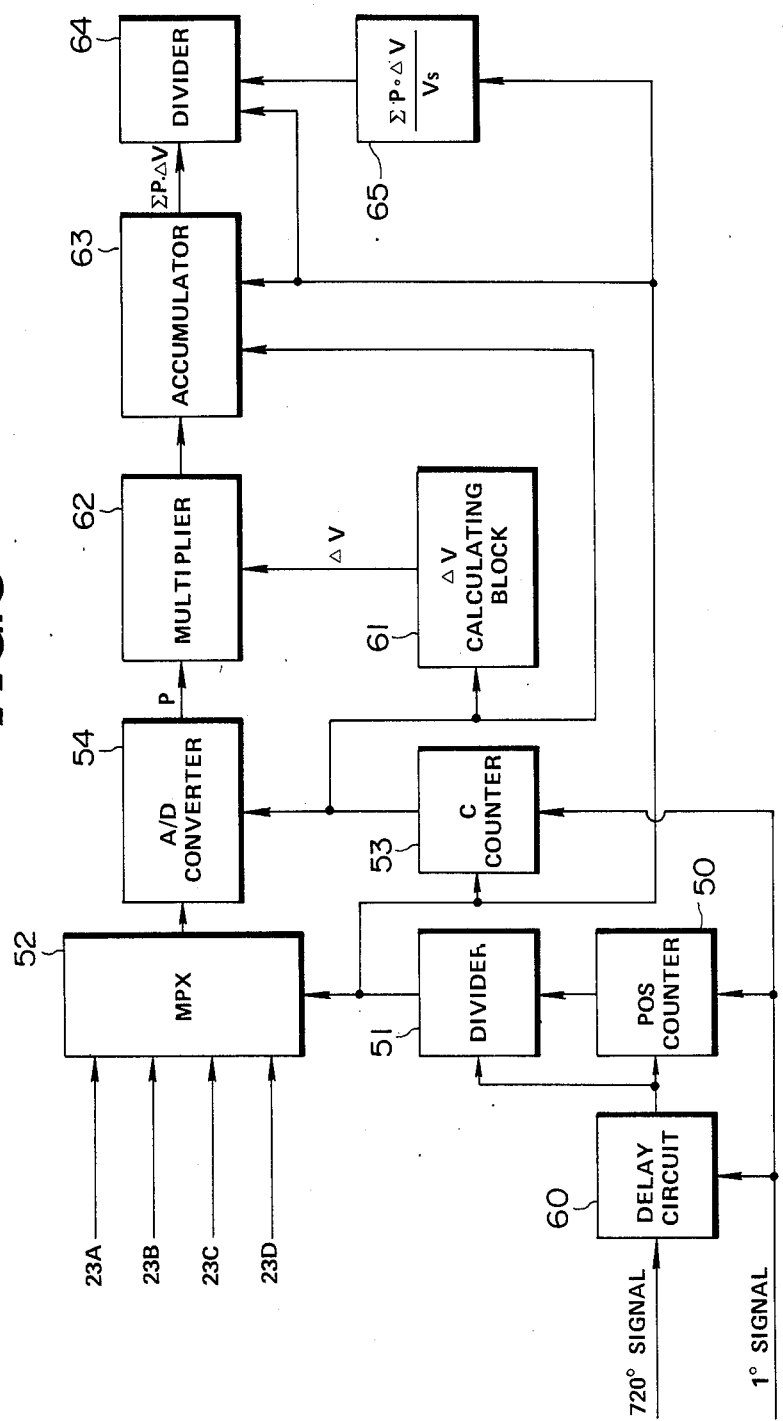
FIG. 8 is a simplified circuit block diagram of means for detecting an indicated mean effective pressure $P_i$ for each engine cylinder in place of detecting the value of $P_{max}$.
Figure 9:
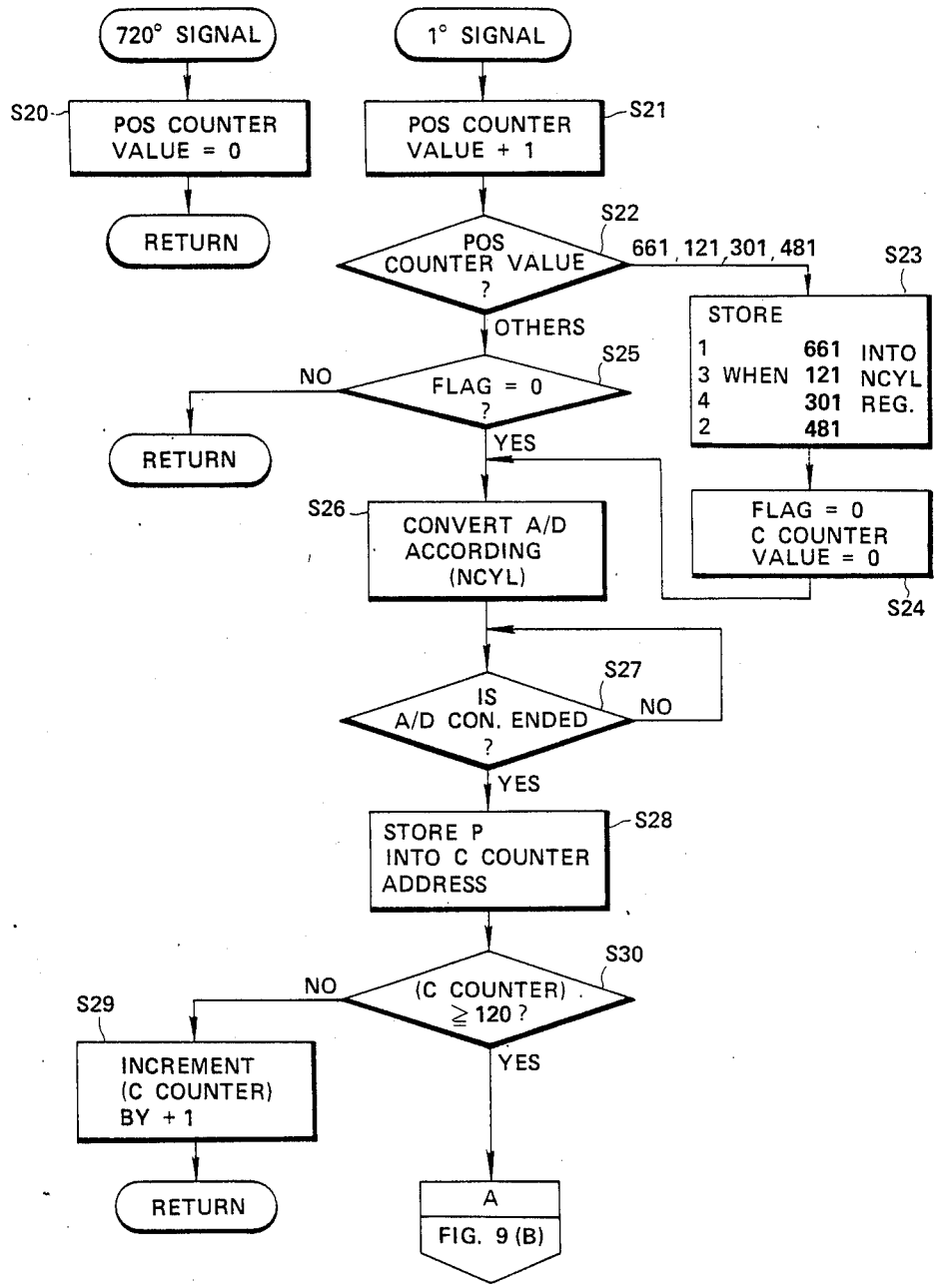
FIGS. 9(A) and 9(B) are integrally an operational flowchart on which a microcomputer executes for detecting the indicated mean effective pressure $P_i$ in place of the circuit configuration shown in FIG. 8.
Figure 9B:
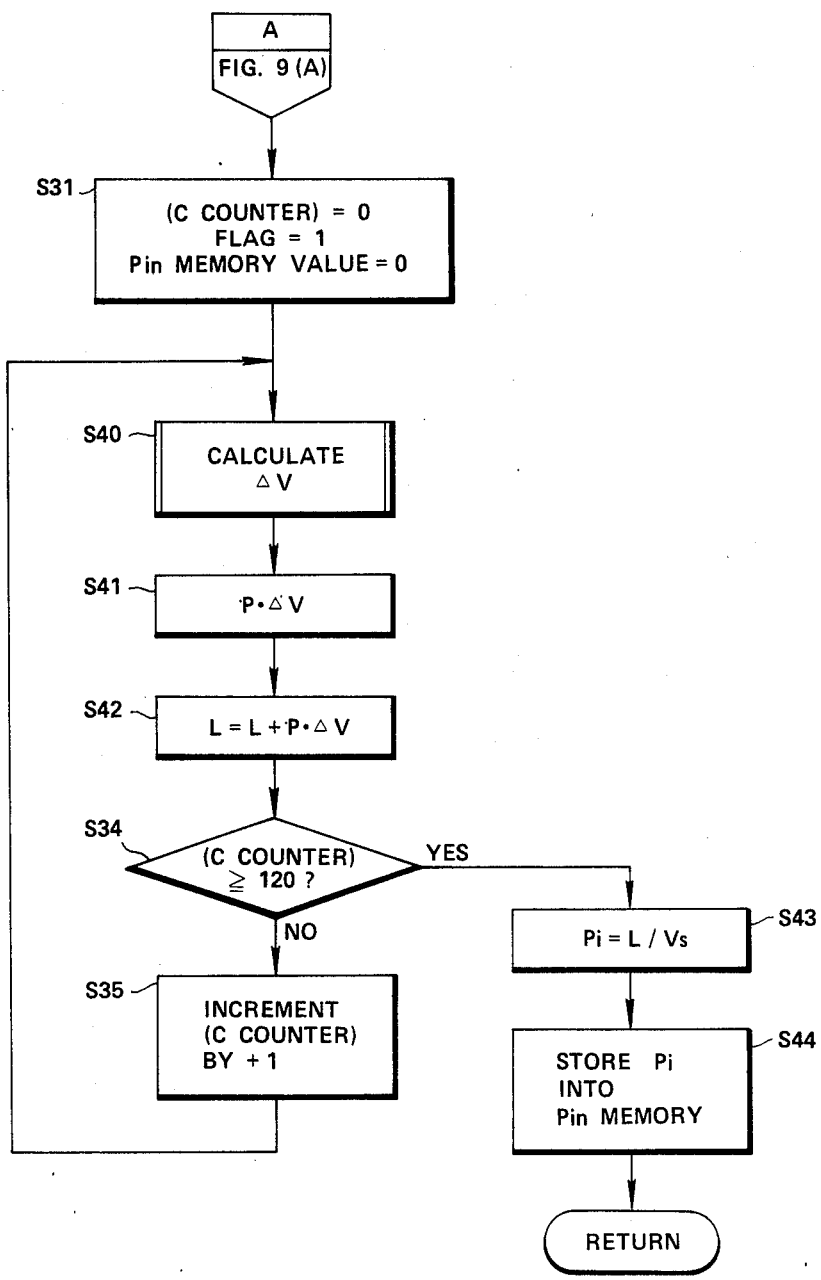

A specific configuration for detecting the indicated mean effective pressure $P_i$ is shown in FIG. 8, FIG. 9(A), and FIG. 9(B).

That is to say, a minute work L ($=P\times\alpha V$) which is the pressure value P multiplied by a minute change $\Delta V$ in a cylinder volume is accumulated over an interval ranging from a plus predetermined crank angle to a minus predetermined crank angle (, e.g., $\pm 60°$) before and after the top dead center (TDC) in the compression stroke.

The accumulated value $\Sigma(P\times\Delta V)$ divided by a cylinder volume V from the top dead center in the compression stroke to the predetermined crank angle is used as the indicated mean effective pressure $P_i$ (in steps S40 through S42, steps S34, and S43).

It should be noted that in the case the basic target value of the cylinder pressure to be compared needs to be the basic target value $P_{io}$ of the indicated mean effective pressure. FIG. 10 shows an example of a table of the basic target value $P_{io}$ with respect to the engine speed and accelerator pedal depression angle.

An action of the above-described internal configuration of the control unit 25 will be described below with reference to a flowchart shown FIG. 3.

A control arithmetic operation is executed, e.g., whenever a constant period of time has passed or in synchronization with the engine revolution speed. In this case, the flowchart shown in FIG. 3 is executed once for each engine revolution.

A control of fuel injection quantity to the engine is carried out in steps S8 through S11.

Figure 3:
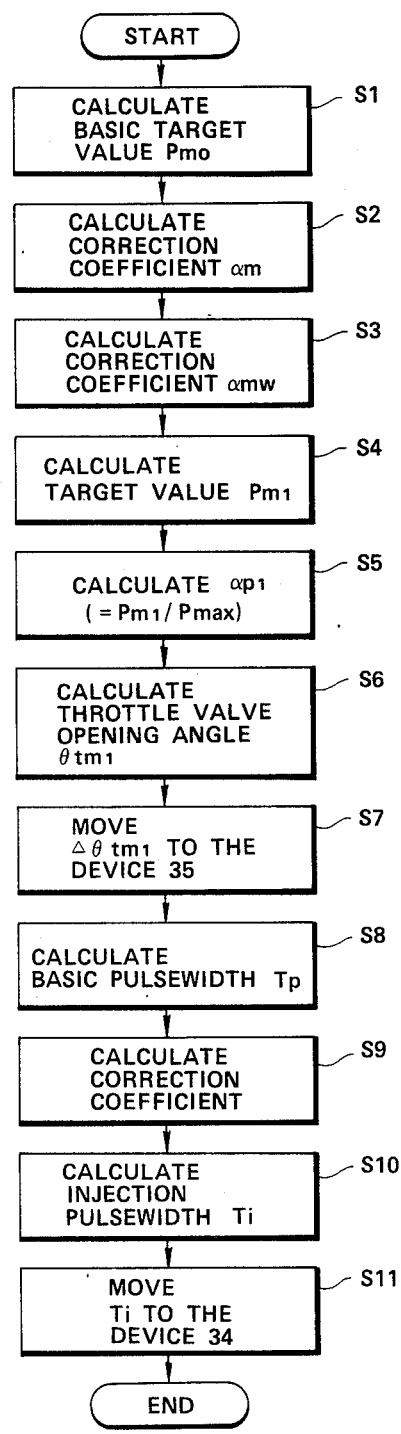
FIG. 3 is an operational flowchart on which the control unit shown in FIG. 1 executes.

In FIGS. 2 and 3, in the basic injection quantity calculating block 32, a pulsewidth $T_p$ is calculated corresponding to a basic fuel injection quantity at a step S8 from the values of $Q_a$ and N in a table look up technique in the following way:

$$T_p = K \times Q_a/N,$$

wherein K is a constant number.

In the fuel injection quantity correction calculating block 33, a correction coefficient for correcting the basic pulsewidth $T_p$ (, e.g., a cooling water temperature incremental correction coefficient to increase the amount of fuel when the engine is not sufficiently warmed up) is calculated in a step S9 and an actual pulsewidth $T_i$ is calculated through a multiplication of the basic pulsewidth $T_p$ by the correction coefficient.

In the fuel, injection valve actuation device 34, the fuel injection valve is actuated in a step S11 to open to inject fuel the quantity of which is derived at the step S10.

In this way, as the value of $Q_a$ is increased, the fuel injection quantity is accordingly increased so that the cylinder pressure is increased.

Next, a feedback corrective control of a target value on the basis of a detected value of the cylinder pressure is carried out in steps S1 through S7 shown in FIG. 3.

That is to say, in the target value calculating block 26, the value of $P_{mo}$ derived according to the instantaneous engine operating condition is calculated from the values of N and $\theta_a$ through an arithmetic operation or in a table look-up technique in a step S1.

The target value correction calculating block 28 calculates the correction coefficient $\alpha_{mw}$ for correcting the value $P_{mo}(=K_{mw}\times F_t\times K_{adv}$, $K_{mw}$ is the constant number) in a step S3 and a correction coefficient $\alpha_m(=1+K_m\times d\theta_a/dt$, $K_m$ is a constant number) in a step S2. The target value correction calculating block 28 finally calculates $P_{m1}$ by a multiplication of the calculated values $\alpha_{mw}$, $\alpha_m$ by the value of $P_{mo}(P_{m1}=\alpha_{mw}\times\alpha_m\times P_{mo})$ in a step S4.

Next, in a comparing block 29 a ratio $\alpha P_1$ of $P_{max}$ to $P_{m1}$ is calculated in a step S5 as follows: $\alpha P_1 = P_{m1}/P_{max}$. It should be noted that the value of $P_{max}$ may be derived from the pressure sensor 23 installed on a representative engine cylinder as an average value of the maximum values $P_{max}$ for each of two engine revolutions derived from each pressure sensor 23A through 23D installed on the corresponding engine cylinder as described above with reference to FIG. 5 and FIGS. 6(A) and 6(B), or the step S5 may be executed for each half revolution.

The throttle valve actuation opening angle calculating block 30 multiplies the value of $\alpha P_1$ by the value of $\theta_{tm1b}$ calculated at the previous execution time to obtain the present calculation $\theta_{tm1a}(=Kt_1\times\alpha P_1\theta_{tm1b}$, $Kt_1$ is a constant number) in a step S6 so that $\Delta\theta_{tm1}(\theta_{tm1a}-\theta_{tm1b})$ is calculated in a step S6.

The value of $\{\theta_{tm1}$ thus obtained is transferred to the throttle valve actuation device 35 as the drive signal so that the throttle valve actuation device 35 actuates the throttle valve 14 to open or close the throttle valve 14 according to the value of $\Delta\theta_{tm1}$.

For example, if the actual detected value is higher than the target value, the ratio $\alpha P_1$ is smaller than $1(\alpha P_1 < 1)$, $\theta_{tm1a} < \theta_{tm1b}$, and thus $\Delta\theta_{tm1} < 0$. At this time, the throttle valve actuation device 35 reduces the opening angle by the opening angle determined by an absolute value of $\Delta\theta_{tm1}$. Therefore, the value of $Q_a$ is reduced and the reduction of $Q_a$ causes the reduction of fuel injection quantity. Consequently, the value of $P_{max}$ is reduced to approach to the value of $P_{m1}$. On the other hand, if the actual detection value is lower than the target value, the throttle valve actuation device 35 increases the throttle valve opening angle. Thus the value of $P_{max}$ increases and approaches the value of $P_{m1}$.

In this way, the value of $P_{max}$ coincides with the value of $P_{m1}$ so that the same cylinder pressure can always be achieved with the same depression angle of the accelerator pedal. In other words, a stable control of the engine output via such a cylinder pressure control can be achieved with a previously set target value not being affected by the difference in engine operating environment and the aging effect.

It should be noted that the accelerator opening angle change rate detecting block 27 is added to improve driveability during transient operation. A basic configuration is satisfied without the presence of the detecting block 27.

Therefore, the change in the basic target value with respect to time ($dP_{mo}/dt$) may be calculated in place of the change rate of the basic target value with respect to time $d\theta_a/dt$.

Figure 11:
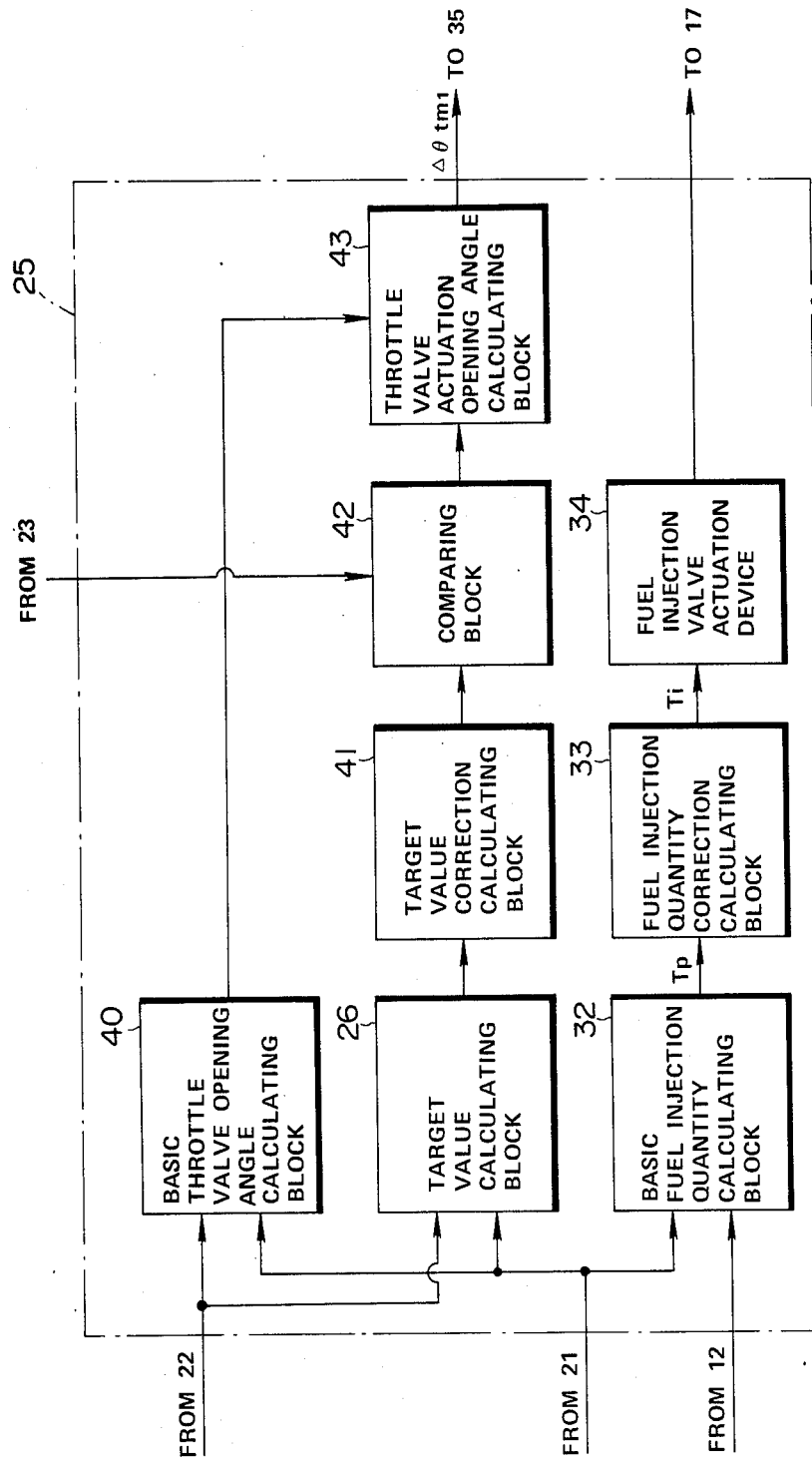
FIG. 11 is another simplified functional block diagram of the control unit in a second preferred embodiment.

FIG. 11 shows a functional block diagram of the control unit 25 in a second preferred embodiment according to the present invention.

Figure 12:
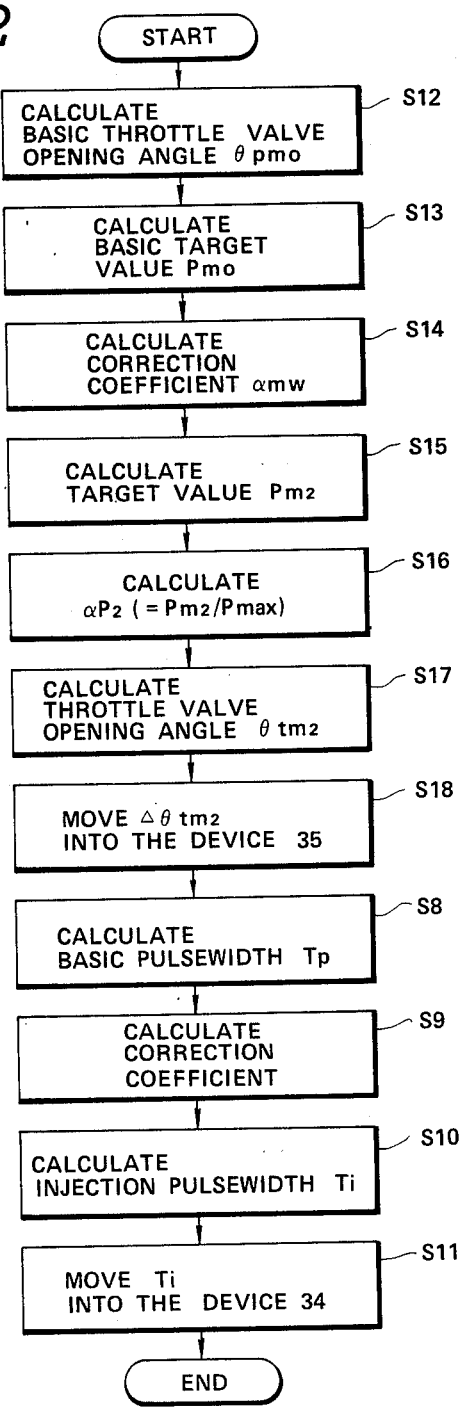
FIG. 12 is an operational flowchart on which the control unit shown in FIG. 11 executes.

FIG. 12 shows an operational flowchart on which the microcomputer constituting the control unit 25 executes in the second preferred embodiment.

Although the throttle valve opening angle is derived on the basis of the previously detected opening angle of the throttle valve in the first preferred embodiment, with the basic throttle valve opening angle $\theta_{tmo}$ previously calculated from the engine operating condition the throttle valve opening angle is, in the second embodiment, calculated from the basic throttle valve opening angle $\theta_{tmo}$.

In more detail, the basic throttle valve opening angle calculating block 40 shown in FIG. 11 calculates the basic throttle valve opening angle $\theta_{tmo}$ from the values of N and $\theta_a$ through an arithmetic operation or in a table look-up technique. A table on the basic throttle valve opening angle $\theta_{tmo}$ is shown in FIG. 13 when the table look-up technique is used.

A throttle valve actuation opening angle calculating block 43 calculates a throttle valve opening angle $\theta_{tm2}$ from the value of $\theta$tmo in the following equation:

$$\theta_{tm2} = K_{t2} \times \alpha_{p2} \times \theta_{tmo}, \qquad (6)$$

wherein $K_{t2}$ is a constant number. In equation (6), $\alpha_{p2}$ denotes a ratio between the actual maximum value of the cylinder pressure and target value for the maximum value in the cylinder pressure. The ratio $\alpha_{p2}$ can be calculated in the comparing block 42 as follows:

$$\alpha_{p2} = P_{m2}/P_{max} \qquad (7)$$

The target value correction calculating block 41 shown in FIG. 11 corrects the value of $P_{mo}$ with various engine operating variables such as the engine cooling water temperature, etc. and calculates the final target value $P_{m2}$ in the following equation.

$$P_{m2} = \alpha_{mw} \times P_{mo} \qquad (8)$$

To calculate the throttle valve actuation opening angle $\Delta\theta_{tm2}$ from the value of $\theta_{tm2}$, a difference of the present throttle valve opening angle from the previous throttle valve opening angle may be obtained in the same way as the first preferred embodiment. Thus, the throttle valve actuation device 43 drives to open or close the throttle valve 14 according to the value $\Delta\theta_{tm2}$.

It should be noted that since other parts shown in FIGS. 11 and 12 are the same as those shown in FIGS. 2 and 3, the same reference numerals designate corresponding elements and the detailed description is omitted here.

The same action and effect in the second embodiment as the first embodiment can be achieved.

Furthermore, since the value of $\theta_{tmo}$ is previously obtained according to the engine operating condition, the value of $t_{mo}$ is immediately changed even when the operator changes the operating condition, and thus the responsiveness of the engine is improved.

Although the value of $\theta_{tmo}$ is calculated from the values N and $\theta_a$ in the second preferred embodiment, the value of $\theta_{tmo}$ may be calculated from the value of $P_{mo}$ through the arithmetic operation or in the table look-up technique.

Figure 14:
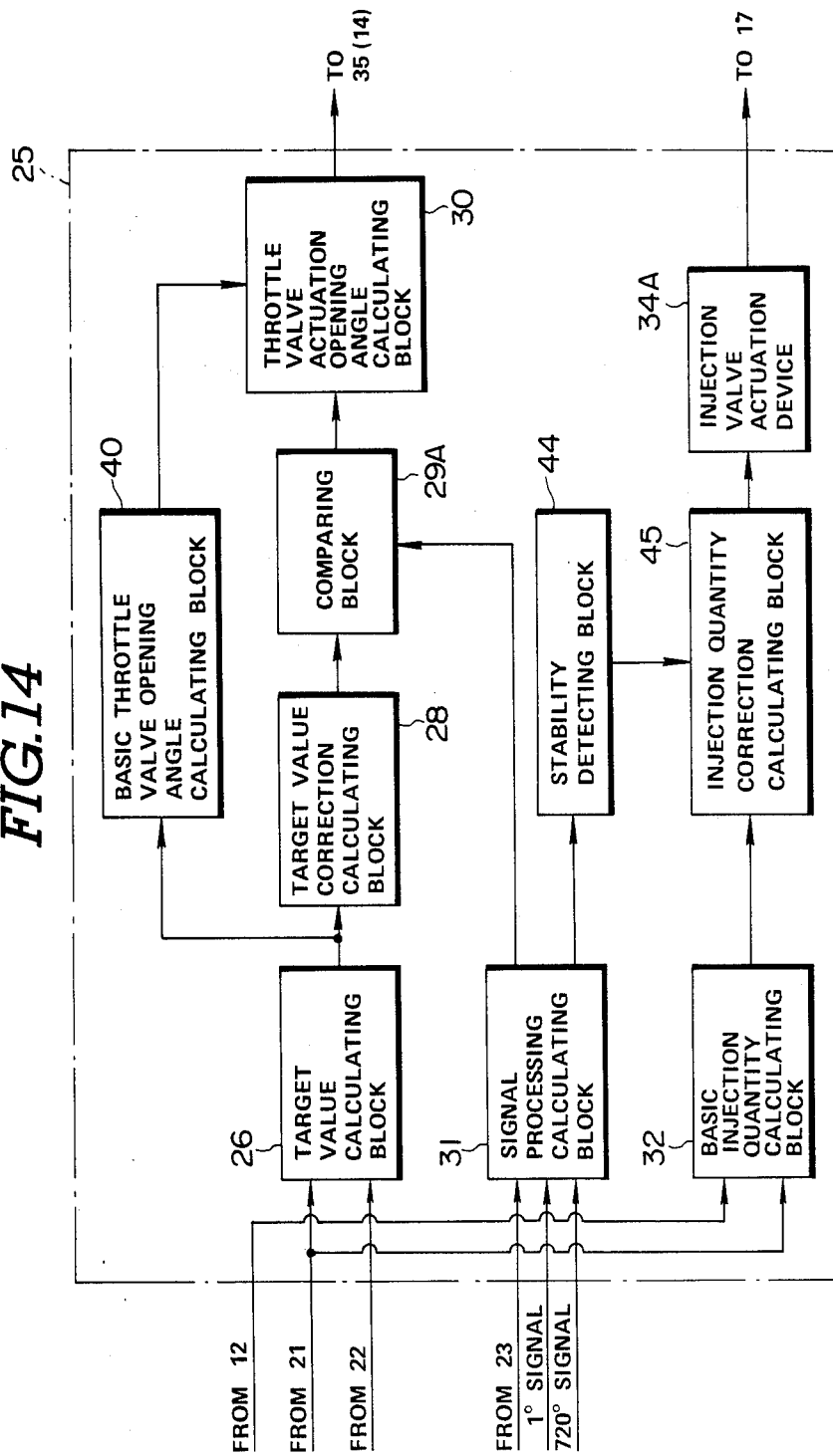
FIG. 14 is still another functional block diagram of the control unit in a third preferred embodiment.

FIG. 14 shows a functional block diagram of the control unit 25 in a third preferred embodiment.

In FIG. 14, a comparing block 29A compares the value of $P_{mo}$ derived from the target value correction calculating block 28 and the maximum value $P_{max}$ of the cylinder pressure outputted from a signal processing calculating circuit 31 and calculates a ratio $\alpha_p$ in the following equation.

$$\alpha_p = P_m/P_{max} \qquad (9)$$

The throttle valve actuation opening angle calculating block 30 in this embodiment calculates the throttle valve opening angle value $\theta_{tm}$ on the basis of the value $P_{tmo}$ derived from the basic throttle valve opening angle calculating block 40 and the ratio $\alpha_p$ whenever a predetermined time (, e.g., a predetermined crack angle of 360°) has passed.

$$\theta_{tm} = K_t \times \alpha_p \times \theta_{tmo}, \qquad (10)$$

wherein $K_t$ denotes a constant number. $\theta_{tm}$ calculated in the above equation (10) is the current throttle valve opening angle. The throttle valve actuation opening angle $\Delta\theta_{tm}$ by which the throttle valve is actuated to indicate the opening angle of $\theta_{tm}$ may, for example, be calculated from a difference between the opening angle values of the present and previous calculation results; $\Delta\theta_{tm} = \theta_{tma} - \theta_{tmb}$. In the multi-cylinder engine, the values of $\theta_{tm}$ for all cylinders are averaged for each engine cycle and the average value is adopted as the value of $\theta_{tm}$. In addition, the function of basic throttle valve opening angle calculating block 40 may be incorporated in the throttle valve actuation opening angle calculating block 30. In this case, the value of $\theta_{tm}$ may be calculated in the throttle valve actuation opening angle calculating block 30 from the following equation.

$$\theta_{tm} = K_t' \times \alpha_p \times P_{mo}, \qquad (11)$$

wherein $K_t' = K_t \times K_m$.

The throttle valve actuation device 35 actuates the throttle valve 14 according to the calculated $\Delta\theta_{tm}$.

Next, the basic fuel injection quantity calculating block 32 calculates the basic pulsewidth $T_p (= K \times Q_a/N$, wherein K is a constant number) from engine operating parameters, e.g., from intake air quantity $Q_a$ detected by the airflow meter 22 and engine revolutional speed N from the engine revolutional speed sensor 31. The basic pulsewidth $T_p$ corresponds to the fuel injection quantity injected from the fuel injection valve 27. Numeral 44 denotes a stability detecting block which compares the crank angle position $\theta_{pmax}$ (to be described later) which corresponds to the value $P_{max}$ calculated in the signal processing calculating block 31 with the limit value of a predetermined crank angle range predefined as a stable range of the engine. If $\theta_{pmax}$ falls within the predetermined crank angle range, the stability detecting block 44 determines that the engine is stably operating and outputs logic a "0" signal. If $\theta_{max}$ does not fall within the predetermined crank angle range predefined as the engine stable range, the stability detecting block 44 determines that the engine is not stably operating and outputs logic "1" signal. Numeral 45 denotes an injection quantity correction calculating block which reduces gradually a correction coefficient $\alpha$ of air-fuel mixture ratio on the basis of the following equation so as to return the engine output in the vicinity of a limit value of the stable range to improve fuel consumption when the output signal from the stability detecting block 43 is "0", thus the air-fuel mixture ratio becomes lean.

$$\alpha = \alpha_B - \Delta\alpha 1 \tag{12}$$

, wherein $\alpha_B$ denotes the previously calculated air-fuel mixture ratio correction coefficient and $\Delta\alpha 1$ denotes an air-fuel mixture leaning correction factor.

When the output signal of the stability detecting block 43 is "1", the injection quantity correction calculating block 45 increases gradually the correction coefficient $\alpha$ on the basis of the following equation so as to return the engine output to the limit value of the stable range. Thus, the air-fuel mixture ratio becomes richer.

$$\alpha = \alpha_B + \Delta\alpha_r \tag{13}$$

wherein $\Delta\alpha_r$ denotes an air-fuel mixture riching correction factor. The arithmetic operation shown in either of the euqation (12) or (13) is carried out once for each predetermined period of time (, e.g., once for each engine revolution).

The injection quantity correction calculating block 34A calculates the fuel injection pulsewidth $T_i$ in the following equation (14).

$$T_i = T_p \times \alpha + T_s \tag{14}$$

wherein $T_s$ denotes a battery voltage variation correction factor for correcting the variation of a drive voltage applied to the fuel injection valve 27.

It should be noted that a correction control for maintaining the engine output in the vicinity of the stable range is not carried out when the engine is under high-load, under high revolution conditions, started, warmed up, and in a idling state under which the high engine output is required (, i.e., under such conditions the factor $\alpha$ is zero). Hence, under such engine operating ranges, the same control as the conventional control is carried out. The fuel injection valve actuation device 34A generates a drive signal having a valve opening time corresponding to the injection pulsewidth $T_i$ at a predetermined timing (for example, once for each engine revolution) to actuate the fuel injection valve(s) 17 for opening same.

FIG. 16 shows a functional block diagram of the stability detecting block 44 shown in FIG. 14. The stability detecting block 44 comprises: a memory section 51A for storing values of $\theta_{pmax}$; a calculating section 52A for calculating a control width (a predetermined crank angle range) of a limit value from the stored value $\theta_{pmax}$ in the memory 51; a memory section 53A for storing the upper and lower limits of the control width; and a determining section 54A for determining whether the value $\theta_{pmax}$ falls within the control width by comparing the value $\theta_{pmax}$ with the stored upper limit value and lower limit value. In detail, the memory section 51 stores the measured values of $\theta_{pmax}$ by an n cycle (e.g., four times) for each engine cylinder into a memory location allocated to each cylinder. The calculating section 52A reads the contents of the memory section 51A, calculates the average values AV1 through AV4 of $\theta_{pmax}$ for each engine cylinder, and calculates the upper limit values A1 through A4 and lower limit values B1 through B4, respectively. It is preferable that the average values are movable average values maintaining the past operating states in a relatively favorable state. In addition, the upper and lower limit values A and B are set in such a way that the difference between the upper and lower limit values A and B and the average value AV gives a number of a root mean square value (four) to which two is added, i.e., six to provide an allowance for the root means square value of a dispersion value (sixteen) of $\theta_{pmax}$ at a predetermined limit of a stable area.

The calculating section 52A determines whether the value $\theta_{pmax}$ detected at the last cycle among the above-described n cycles falls within a stable range from the upper limit value A to the lower limit value B of the detected cylinder. The memory section 53A functions as a counter allocated to each cylinder in which the value U1 through U4 of a counter corresponding to the engine cylinder is incremented by one when either of two inequalities is satisfied for the engine cylinder; $\theta_{pmax} > A$ or $\theta_{pmax} < B$. The determining section 54A determines that the engine operation falls out of the stable region and outputs a logic "1" signal when any one of the count values U1 through U4 of the counters for the respective engine cylinders indicates a predetermined value $U_o$ (for example, 3) during a predetermined interval (for example, during 24 engine revolutions) or when the number of engine cylinders C for which the count values U1 through U4 which indicate equal to or more than one reaches a predetermined value $C_o$ (for example, two). The determining section 54 thereafter clears all count values of the memory section 53A. On the other hand, when neither count values U1 through U4 nor number of engine cylinders C indicates the respective predetermined values $U_o$ and $C_o$, the determining section 54 determines that the engine is in the stable region, outputs a logic "0" signal, and clears all counting values of the memory section 53 after a predetermined interval of time has passed.

Next, the detailed function of the signal processing calculating block 31 shown in FIG. 14 which detects $P_{max}$ and $\theta_{pmax}$ will be described with reference to FIG. 17.

FIG. 17 shows a specific circuit configuration of the above-described signal processing calculating block 31 shown in FIG. 14 which is applicable to the four-cylinder engine.

The crank angle position sensor outputs a 720° signal in synchronization with the engine revolution (the crank angle of 720° corresponds to two revolutions of the engine within which four strokes of a multi-cylinder engine are carried out) and outputs a 1° signal whenever the crankshaft rotates through one degree (a period of the 1° signal corresponds to two degrees) as described above with reference to FIG. 5.

The functions of the POS counter 50, divider 51, multiplexer (MPX) 52, C counter 53, analog-to-digital counter (A/D converter) 54, comparator 55, and $P_{max}$ memory 56 are already described with reference to FIG. 5. Therefore, the description of each circuit described above is omitted here. A $\theta_{max}$ memory 67 stores the crank angle value $\theta_{pmax}$ with respect to the top dead center (TDC) in the compression stroke of each engine cylinder. It should be noted that in the $P_{max}$ and $\theta_{pmax}$ memories the stored values of the $P_{max}$ and $\theta_{pmax}$ memories are cleared whenever the output value of the divider 51 is changed.

A $P_{maxi}$ memory 68 is a memory for storing the memory value in the $P_{max}$ memory 67 corresponding to each cylinder and a $\theta_{pmaxi}$ memory 69 is a memory for storing the memory value of each cylinder. The updating of the values of these memories 68, 69 is carried out when the output value of the divider 51 is changed. The stored values of $P_{max}$ and $\theta_{pmax}$ stored respectively in the $P_{max}$ memory 56 and $\theta_{pmax}$ memory 67 are sequentially stored into these $P_{maxi}$ and $\theta_{pmaxi}$ memories before the clear operation. That is to say, if the values of $P_{max}$ and $\theta_{pmax}$ in the i-order cylinder are expressed by $P_{maxi}$ and $\theta_{pmaxi}$ (wherein i=1 through 4 in the four-cylinder engine), the values of $P_{max1}$, $P_{max3}$, $P_{max4}$, and $P_{max2}$ are stored sequentially in the $P_{maxi}$ memory 68 for an order of the output values 1, 2, 3, and 4 of the divider 51. On the other hand, the values of $\theta_{pmax1}$, $\theta_{pmax3}$, $\theta_{pmax4}$ and $\theta_{pmax2}$ are stored sequentially in the $\theta_{pmaxi}$ memory 69 for the order of the output values 1, 2, 3, and 4 of the divider 51.

The above-described detection of $P_{max}$ and $\theta_{pmax}$ for each cylinder can also be carried out by the use of the microcomputer.

Figure 18A:
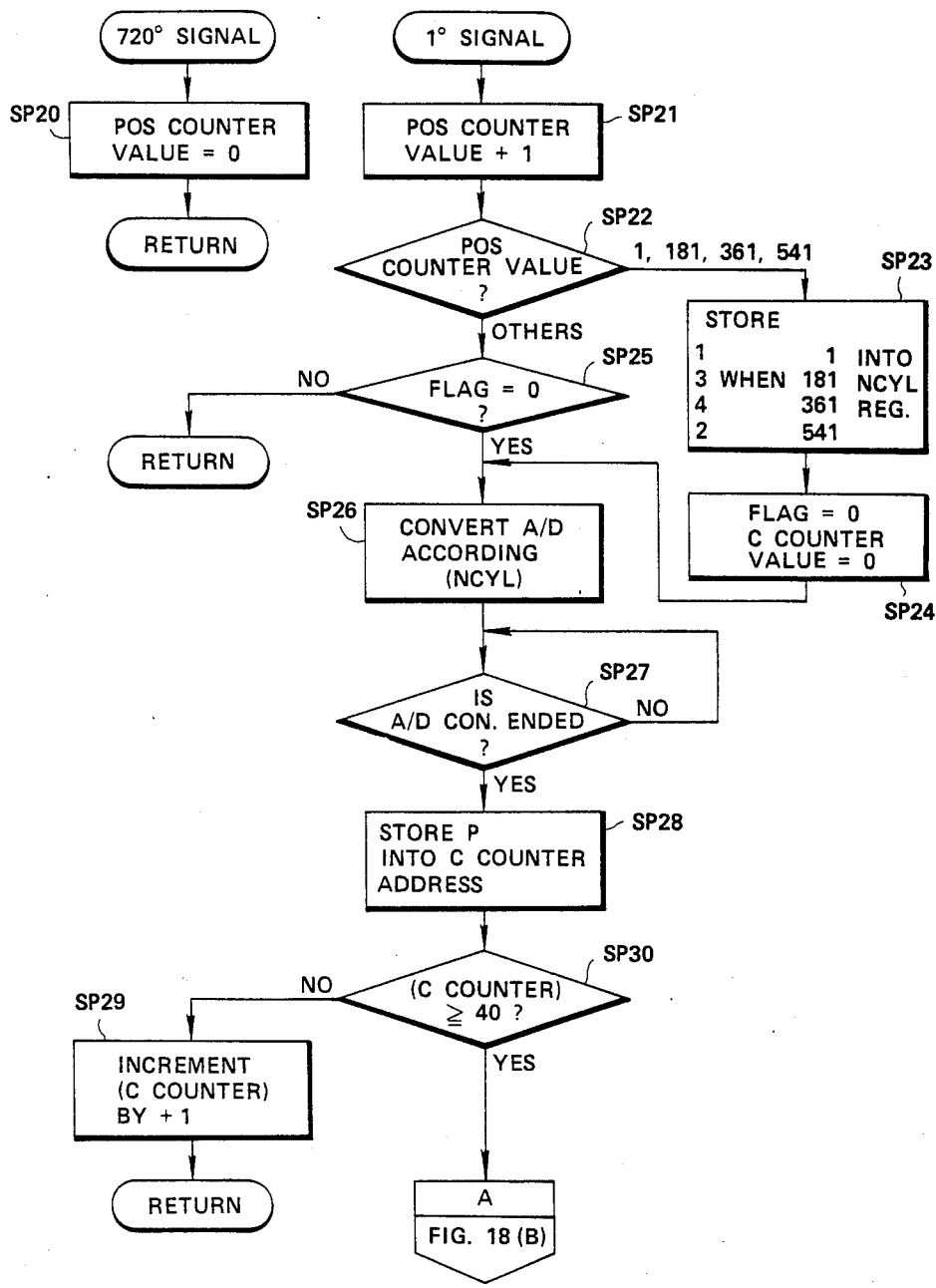
FIGS. 18(A) and 18(B) are integrally an operational flowchart on which the microcomputer executes in place of the circuits shown in FIG. 17 for detecting $P_{max}$ and $\theta_{pmax}$ for each engine cylinder.
Figure 18B:
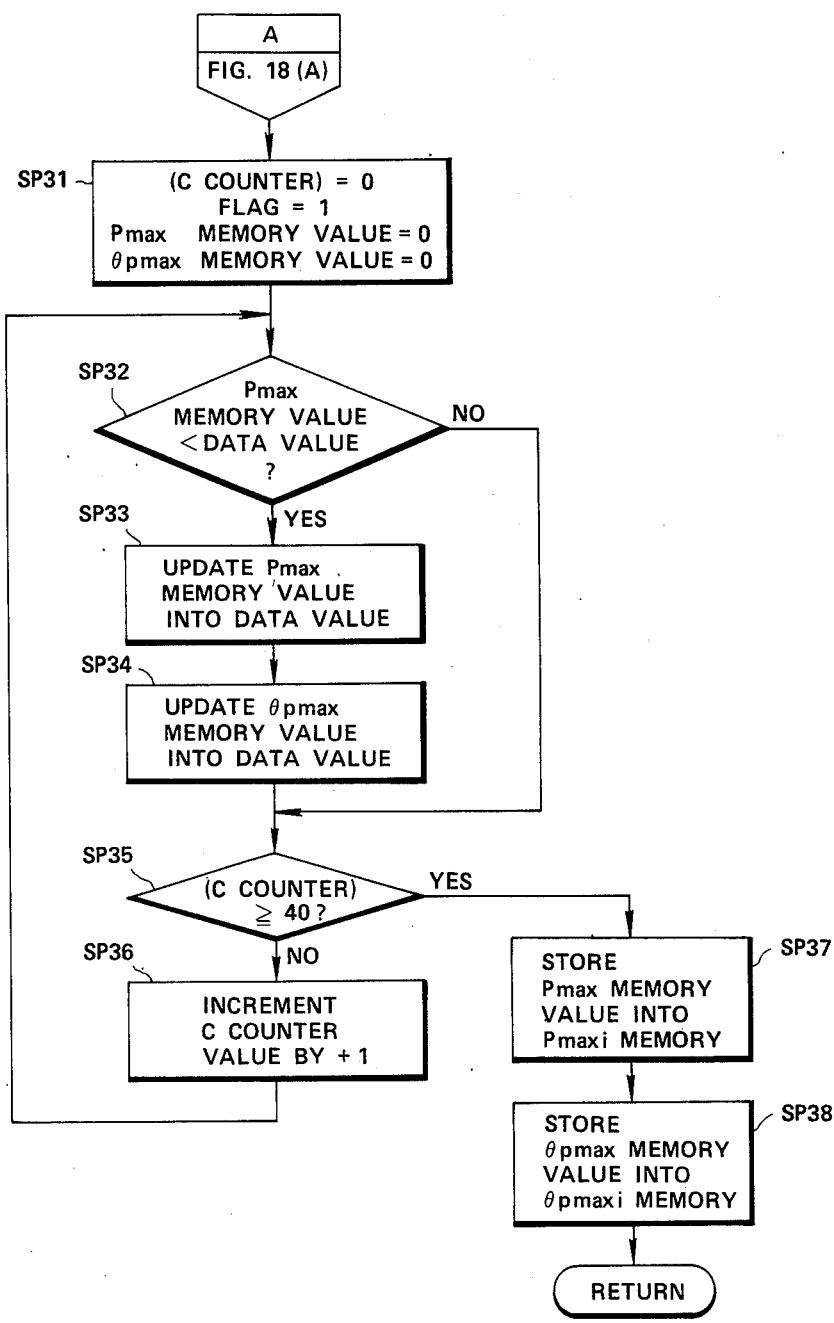

A flowchart on which the microcomputer executes is shown in FIGS. 18(A) and 18(B).

The flowchart shown in FIGS. 18(A) and 18(B) comprises two kinds of programs: a program executed whenever the 720° signal is received and a program executed whenever the 1° signal is received as described above with reference to FIGS. 6(A) and 6(B).

The 720° signal rises when a piston of the first cylinder has arrived at the top dead center (TDC) in its compression stroke. Thus the program synchronized with the 720° signal is started in response to the rise in the 720° signal. The value of the POS counter 50 is cleared when the 720° signal rises in a step SP20.

Furthermore, since the crank angle position at which $P_{max}$ is generated falls generally within 40 degrees with respect to the top dead center in the compression stroke, the cylinder pressure P and crank angle position $\theta_p$ after the top dead center in the compression stroke are simultaneously detected whenever the 1° signal is received until the crank angle position has reached 39° after the top dead center (TDC) in the compression stroke. The detected values of P and $\theta_p$ are stored. Thereafter, among the detected and stored values of P and $\theta_p$, the microcomputer selects the maximum value $P_{max}$ and selects the crank angle position $\theta_{pmax}$ after the top dead center in the compression stroke. That is to say, the detection of P and $\theta_p$ is carried out in the steps SP21 through SP30 and the selection of $P_{max}$ and $\theta_{pmax}$ is carried out in the steps SP31 through SP38.

Specifically, since the top dead center in the compression stroke of each engine cylinder is indicated when the POS count values of the POS counter indicate 1, 181, 361, and 541, the flag (FLAG) for starting the detection of P is turned to "0" and the C counter is cleared (steps SP22 and SP24). Since the POS counter starts counting in response to the rising edge of the 1° signal immediately after the reset signal (720° signal) is received, the count value thereof is deviated by one when the top dead center in the compression stroke is reached (refer to FIG. 7). Since the function of FLAG is already described before with reference to FIGS. 6(A) and 6(B), the description of the FLAG is omitted here.

The contents of the step SP23 is also already described thus is omitted here.

In this way, when the top dead center of a particular engine cylinder is determined, the analog-to-digital conversion is carried out by the selection of a channel of the A/D converter at which the pressure signal of the cylinder pressure sensor for each cylinder according to the cylinder number of the particular engine cylinder. Thereafter, the values of P and $\theta_p$ are stored in a register of a C counter address (corresponds to the counting value of the C counter) as data values (steps SP26 through SP28).

The storage operation of the values P and $\theta_p$ is continued until 39 degrees after the top dead center in the compression stroke of each cylinder. When the crank angle position reaches 40 degrees after the top dead center in the compression stroke of each cylinder, the determinations of respective maximum values $P_{max}$ and $\theta_{pmax}$ are carried out (steps SP29 and SP30).

Next, to halt the detection of P, a flag (FLAG) is turned to "1" in a step SP31. In addition, the count value of the C counter, the memory value of $P_{max}$ stored in the $P_{max}$ memory, and the memory value of $\theta_{pmax}$ in the $\theta_{pmax}$ memory are once cleared in the step SP31.

Thereafter, the memory value of $P_{max}$ memory is compared with the data value of the C counter address in a step SP32. If the data value of the C counter address is greater than the memory value of $P_{max}$ memory, the memory values of $P_{max}$ and $\theta_{pmax}$ memories are updated to the corresponding data values in steps SP32 through SP36. Therefore, the value of $P_{max}$ which is the maximum among the data values is stored in the $P_{max}$ memory and the value of $\theta_{pmax}$ which corresponds to the value of $P_{max}$ is stored in $\theta_{pmax}$ memory. When the count value of C counter indicates 40, i.e., the crank angle position reaches 40 degrees after the top dead center in the compression stroke, the values of $P_{max}$ and $\theta_{pmax}$ are moved into the $P_{maxi}$ and $\theta_{pmaxi}$ memories, respectively in steps SP37 and SP38.

The detected values of $P_{max}$ and $\theta_{pmax}$ are sent to the comparing block 29A and stability detecting block 44. However, since these values are simultaneously obtained by means of the signal processing calculating block 31, the cost reduction is possible as compared with the case where the values of $P_{max}$ and $\theta_{pmax}$ are detected separately.

The action in the above-described construction will be described with reference to a flowchart of FIG. 15.

Figure 15:
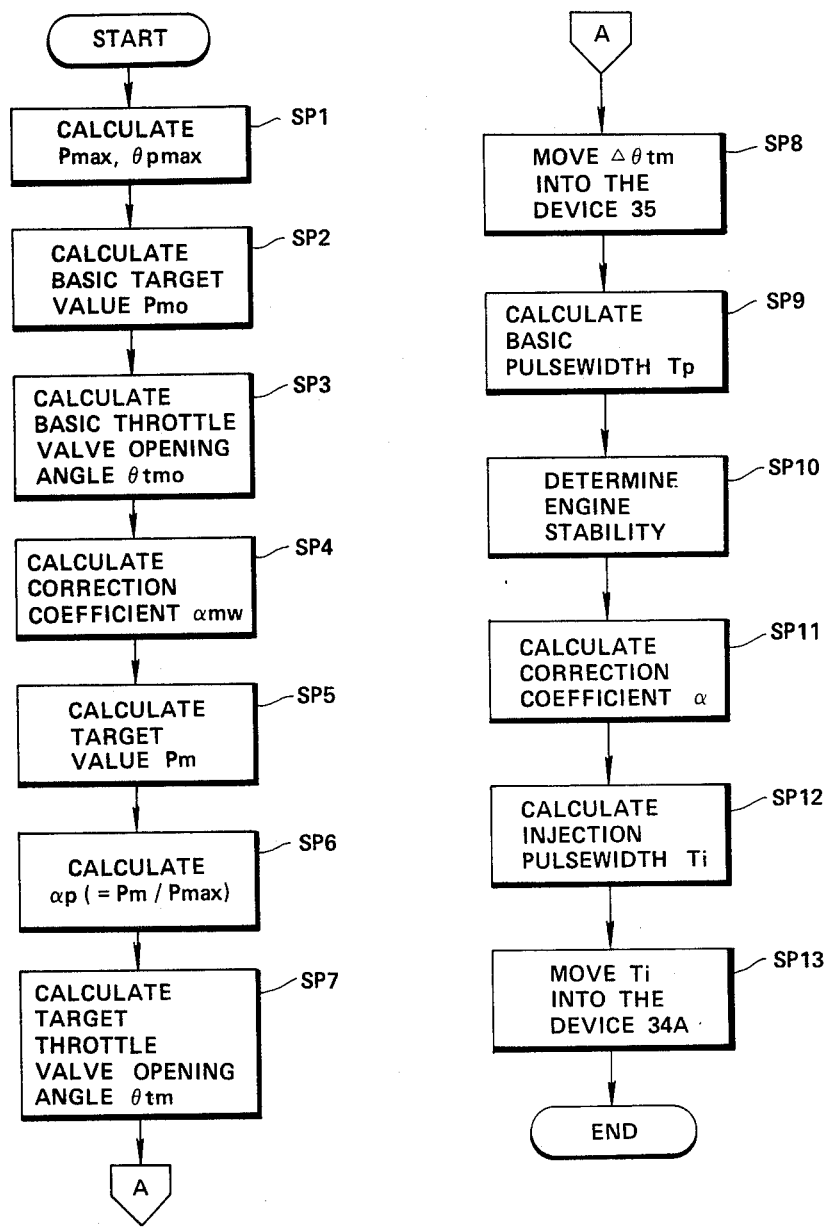
FIG. 15 is an operational flowchart on which the control unit shown in FIG. 14 executes.

Although the control arithmetic operation shown in FIG. 15 is carried out, e.g., for each predetermined period of time or in synchronization with the engine revolution, it is once executed for each engine revolution.

A feedback correction control of a target value on the basis of the detection value of the cylinder pressure is carried out in steps SP1 through SP8.

In a step SP1, the signal processing calculating block 31 calculates $P_{max}$ and $\theta_{pmax}$ for each combustion on the basis of the input signal from the cylinder pressure sensor 33. Since the combustion of fuel is carried out once for two engine revolutions, the step SP1 may be executed after the end of fuel combustion stroke. It should be noted that in the case of multi-cylinder engine, the values of $P_{max}$ and $\theta_{pmax}$ for all cylinders are averaged at a rate of once for two engine revolutions and the averaged values may be used as the values of $P_{max}$ and $\theta_{pmax}$.

In a step SP2, the value of $P_{mo}$ is calculated according to the engine operating condition from the values of N and $\theta_a$ through an arithmetic operation or in a table look-up technique.

In steps SP4 and SP5, the target value correction calculating block 28 calculates the correction coefficient $\alpha_{mw}(=K_{mw} \times F_t \times K_{adv}$ wherein $K_{mw}$ is a constant number) to correct the value of $P_{mo}$ and calculates $P_m(=\alpha_{mw} \times P_{mo})$.

In a step SP6, the comparing block 29A calculates the ratio $\alpha_p(=P_m/P_{max})$.

In a step SP7, the throttle valve actuation opening angle calculation block 30 calculates $\theta_{tm}(=K_t \times \alpha_p \times \theta_{tmo}$, wherein $K_t$ is a constant number) and calculates $\Delta\theta_{tm}(=\theta_{tma}-\theta_{tmb})$. It should be noted that $\theta_{tmo}(=K_m \times P_{mo}$, wherein $K_m$ is a constant number) is calculated in a step SP3 by means of the basic throttle valve opening angle calculating block 40.

The calculated $\Delta\theta_{tm}$ is transferred to the throttle valve actuation device 35 to actuate the throttle valve 14 to open or close through an angle according to the value of $\Delta\theta_{tm}$.

For example, if the actual detected value is higher than the target value, the ratio of $\alpha_p$ is lower than one ($\alpha_p<1$), $\theta_{tma}<\theta_{tmb}$, and $\Delta\theta_{tm}<0$. Consequently, the throttle valve actuation device 35 actuates the throttle valve 14 to close by $\Delta\theta_{tm}$. Thus, the value of intake air quantity $Q_a$ is reduced and the fuel injection quantity is accordingly reduced with the value of $P_{max}$ being reduced to approach the value of $P_m$. On the other hand, if the actual detection value is lower than the target value, the throttle valve actuation device 35 actuates the throttle valve 14 to increase the opening angle of the throttle valve 14, and thus the value of $P_{max}$ is increased and approaches the value of $P_m$.

The fuel injection quantity control is carried out in steps SP9 through SP13.

That is to say, in the step SP9, the basic fuel injection quantity calculating block 32 calculates $T_p(=K \times Q_a/N$, K is a constant number) from the values $Q_a$ and N through an arithmetic operation.

In the step SP10, the stability detecting block 43 compares the crank angle position $\theta_{pmax}$ at which the cylinder pressure indicates maximum with both limit values of the predetermined stable region to determine whether the engine operating condition is in the vicinity of either of the limit values in the stable region. In steps SP11 and SP12, the fuel injection quantity correction calculating block 45 calculates the air-fuel mixture ratio correction coefficient $\alpha$ for maintaining the engine operating condition in the vicinity of limit values in the stable region such that the air-fuel mixture is made thinner when the engine is within the stable region and is made richer when the engine is out of the stable region according to the detection result of the stability detecting block 44 in the feedback control region of the air-fuel mixture ratio. Block 45 also calculates a battery voltage variation correction coefficient $T_s$, and calculates the final fuel injection pulsewidth $T_i(=T_p \times \alpha+T_s)$. The fuel injection quantity correction calculating block 45 calculates other correction coefficients according to the engine operating condition except the air-fuel mixture ratio correction coefficient $\alpha$. The fuel injection valve actuation device 34A actuates the fuel injection valve 27 to open for a duration according to the finally calculated pulsewidth $T_i$ in a step SP13.

Therefore, in an engine operating region in which the air-fuel mixture ratio is fedback on the basis of the air-fuel mixture ratio correction coefficient $\alpha$, the value of $\alpha$ is reduced gradually ($\alpha=\alpha_B-\Delta\alpha 1$) to make the air-fuel mixture thinner when the engine operation falls within the stable region. If the engine operation is not in the stable region, the value of $\alpha$ is increased gradually to make the air-fuel mixture richer ($\alpha=\alpha_B+\Delta\alpha_r$).

In this way, at the same time when the value of $P_{max}$ coincides with the value of $P_m$, the engine is controlled in the vicinity of the limit value of the stable region. Consequently, the same cylinder pressure is always obtained for the same depression angle of the accelerator pedal and the fuel consumption can be suppressed to the minimum.

FIG. 19 shows a functional block diagram of the control unit 25 in a fourth preferred embodiment.

In FIG. 19, the functions of the basic fuel injection quantity calculating block 32, fuel injection correction calculating block 33, fuel injection valve actuation device 34, target value calculating block 26, basic throttle valve opening angle calculating block 40, target value correction calculating block 28, comparing block 29A, throttle valve actuation opening angle calculating block 30, throttle valve actuation opening angle calculating block 30, and the signal processing calculating block 31 are already described with reference to FIG. 2, FIG. 11, and FIG. 14, respectively. Therefore, the description of these functional blocks are omitted here. In FIG. 1 and FIG. 19, numeral 39 denotes an ignition device for igniting spark plugs 40 located within the respective engine cylinders in response to an ignition command signal from the control unit 25.

Numeral 36 denotes an ignition timing calculating block which calculates a basic target value $SA_o$ of the ignition timing from the engine operating variables such as the intake air quantity $Q_a$ detected by the air flow meter 12 and engine speed N detected by the engine speed sensor 21 through the arithmetic operation or table look-up technique.

Numeral 37 denotes an ignition timing correction calculating block in which the basic target value $SA_o$ is corrected so that an optimum ignition timing (for example, an ignition timing MBT (Minimum Spark Advance for Best Torque) at which the optimum fuel consumption is made) can be achieved on the basis of the crank angle position $\theta_{pmax}$ (to be described later) at which the maximum pressure value $P_{max}$ is produced.

The following description is made on the ignition timing control in which the value of $\theta_{pmax}$ at which the ignition timing is in the MBT state is substantially fixed to a known value (15 degrees through 18 degrees after the top dead center) for the engine on which the control unit 25 is mounted regardless of the engine operating condition. That is to say, if the target value for this known value is $\theta_{pmaxo}$, the basic target value $SA_o$ is corrected so that $\theta_{pmax}$ coincides with $\theta_{pmaxo}$ for each combustion stroke. Actually, since the value of $\overline{\theta_{pmax}}$ for each combustion is slightly varied, a movable mean value $\overline{\theta_{pmax}}$ is obtained with respect to the past several times (for example, four times). The difference result between the movable mean value $\overline{\theta_{pmax}}$ and $\theta_{pmaxo}$ corrects the basis target value $SA_o$ as a correction item so that the ignition timing angle value SA is calculated from the following equation:

$$SA = SA_o + \alpha_{sa}(\overline{\theta_{pmax}} - \theta_{pmaxo}), \quad (15)$$

(wherein $\alpha_{sa}$ is a constant number)

The ignition timing angle value SA is calculated by the following equation in which the basic target value $SA_o$ is multiplied by a correction coefficient $\alpha_t$ according to the engine cooling water temperature during an engine warm-up operation in order to promote the engine warming up.

$$SA = \alpha_t \times SA_o \quad (16)$$

($\alpha_t$ is a constant number)

In addition, numeral 38 denotes an ignition signal generator in which the ignition command signal is produced which interrupts a primary current flowing through an ignition coil (not shown) of the ignition device 39 on the basis of the ignition timing angle value SA thus calculated and current supply duration controlled by the battery voltage.

Since the construction of the signal processing calculating block 31 is already described with reference to FIG. 17, the description thereof is omitted here.

The values of $P_{max}$ and $\theta_{pmax}$ (or $\overline{\theta_{pmax}}$) can also be detected by the use of a microcomputer. That is to say, the microcomputer can detect the values of $P_{max}$ and $\theta_{pmax}$ on the basis of the flowchart shown in FIGS. 18(A) and 18(B) as described above on the third preferred embodiment.

Figure 20:
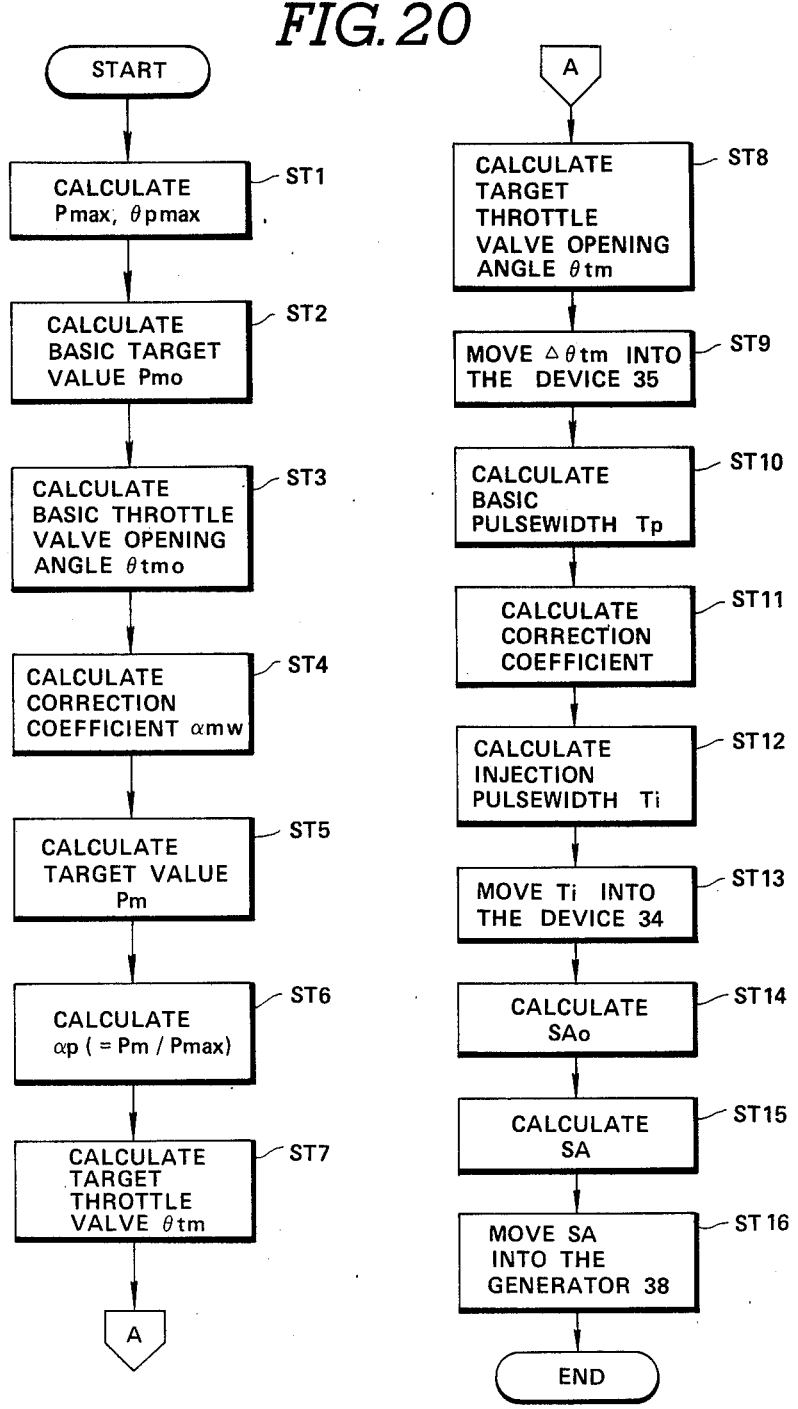
FIG. 20 is an operational flowchart on which the control unit shown in FIG. 19 executes.

The operation of the fifth preferred embodiment will be described with reference to a flowchart shown in FIG. 20. Since in the operational flowchart shown in FIG. 20, the contents of steps ST1 through ST9 are the same as those of the steps SP1 through SP9 of the flowchart shown in FIG. 15, the detailed description of the contents in these steps is not made here.

In steps ST10 through ST12, the injection quantity correction calculating block 32 calculates the correction coefficient, calculates the final fuel injection pulsewidth $T_i$ in which the basic fuel injection quantity pulsewidth $T_p$ is multiplied by the correction coefficient and the fuel injection valve actuation device 34 actuates the fuel injection valve 17 to open to inject fuel, the duration of which is dependent on the final pulsewidth $T_i$.

Next, the ignition timing control is executed in steps ST13 through ST15.

In the step ST13, the ignition timing calculating block 36 calculates the value of $SA_o$ from the engine revolution speed N and intake air quantity $Q_a$.

The ignition timing correction calculating block 37, in step ST14, corrects the value of $SA_o$ according to the cooling water temperature during the warm-up operation (for example, when the cooling water temperature is below 75° C.) and calculates the value of SA through the correction of $SA_o$ so that the value of $\theta_{pmax}$ (or $\overline{\theta_{pmax}}$) coincides with that of $\theta_{pmaxo}$. The ignition signal generator 38 produces the ignition command signal at a timing based on the calculated value SA, the ignition command signal interrupting the primary current in the ignition coil in the ignition device 39.

In this way, when the value of $P_{max}$ coincides with the final target value of $P_m$, the ignition timing is simultaneously controlled to provide the maximum engine output. Thus, the same cylinder pressure can always be produced for the same depression angle of the accelerator pedal.

Figure 21:
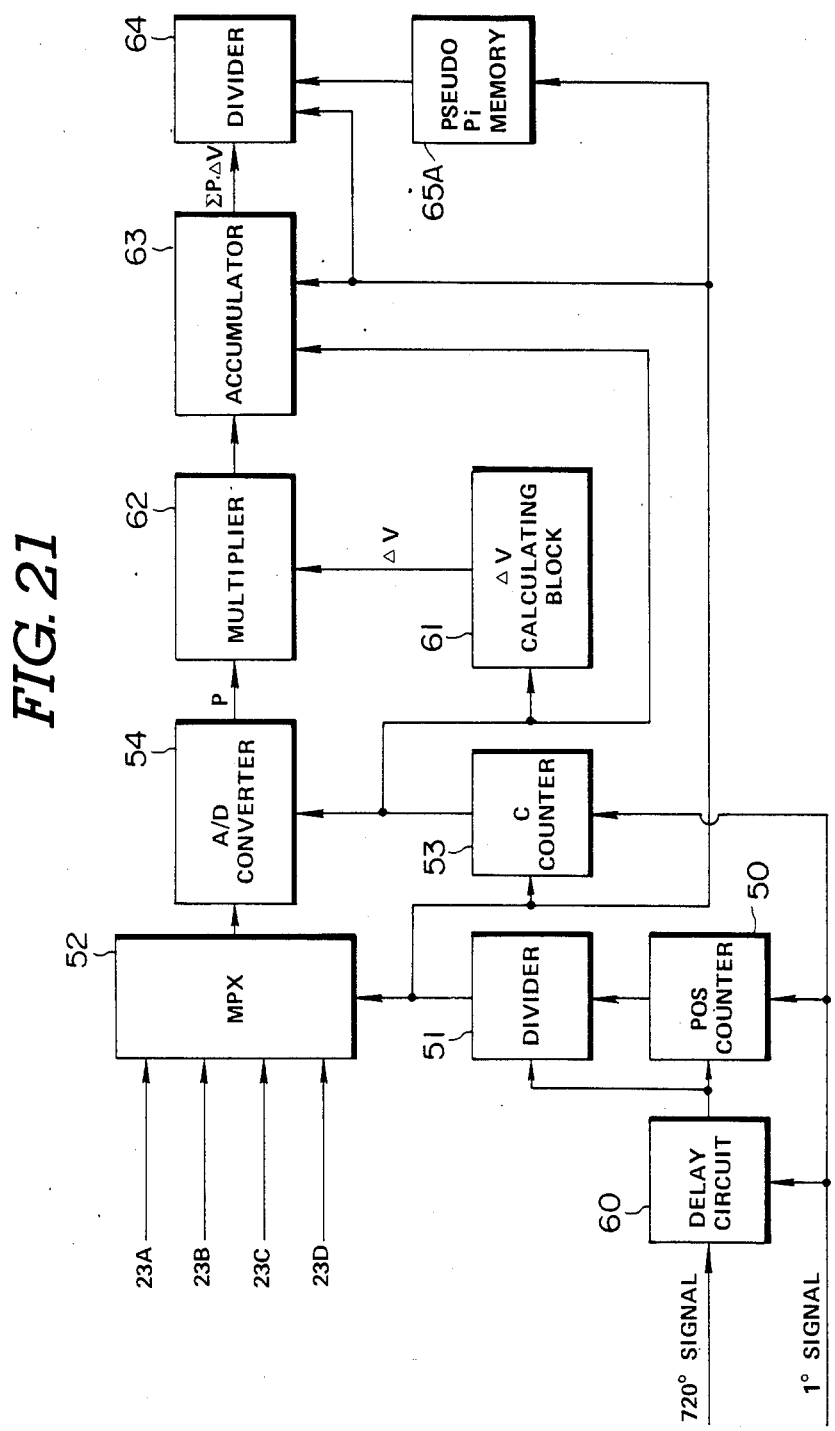
FIG. 21 is a simplified circuit block diagram of means for detecting $\Sigma P \cdot \Delta V$ applicable to a four-cylinder engine in a fifth preferred embodiment.

FIG. 21 shows a specific circuit configuration of means for providing the multiplied value $\Sigma P \times \Delta V$ applicable to the four-cylinder engine of the engine control system in a fifth preferred embodiment.

In FIG. 21, the multiplexor (MPX) 52, divider 51, POS counter 50, delay circuit 60, A/D converter 54, C counter 53, multiplier 62, $\Delta V$ calculating block 61, accumulator 63, and divider 64 are the same as those shown in FIG. 8.

In addition, suppose in the fifth preferred embodiment that the ignition order of the four-cylinder engine is 1st (#1)→3rd (#3)→4th (#4)→2nd (#2), the 720° signal is set as to rise at a time 60° before the top dead center (60°BTDC) in the compression stroke of the first cylinder.

Furthermore, the C counter indicates the crank angular displacement position with respect to a predetermined crank angle (, e.g., 60°BTDC described above).

In FIG. 21, the $\Delta V$ calculating block 61 calculates the change $\Delta V$ in the cylinder volume whenever the count value of the C counter 53 changes. The multiplier 62 calculates the multiplication of the output value P from the A/D converter 54 and the output value $\Delta V$ of the $\Delta V$ calculating block 61. The accumulator 63 calculates the accumulation of the multiplied value $P \times \Delta V$ to derive $\rho P \times \Delta V$.

The divider 64 divides the accumulated value $\Sigma P \times \Delta V$ by the cylinder volume $V_s$. The divided output value $\Sigma P \times \Delta V \div V_s$ is different from the indicated mean effective pressure but becomes a related value thereto. Therefore, it is hereinafter called a pseudo $P_i$.

A pseudo memory 65A is a memory for storing a pseudo memory value for each cylinder. The updating of the memory values is carried out whenever the output value of the divider 51 is changed. The pseudo $P_i$ memory 65A stores sequentially the pseudo value $P_i$ indicated in the divider 64 before it is cleared. That is to say, if the pseudo value in the i cylinder (i=1 through 4) is expressed as $P_{in}$, the pseudo value $P_{in}$ is stored sequentially in such an order of $P_{i1}$, $P_{i3}$, $P_{i4}$, and $P_{i2}$ for the order of first, second, third, and fourth of the output value of the divider 51.

The pseudo value $P_i$ for each cylinder detected in the way described above can also be detected by means of the microcomputer.

Figure 22:
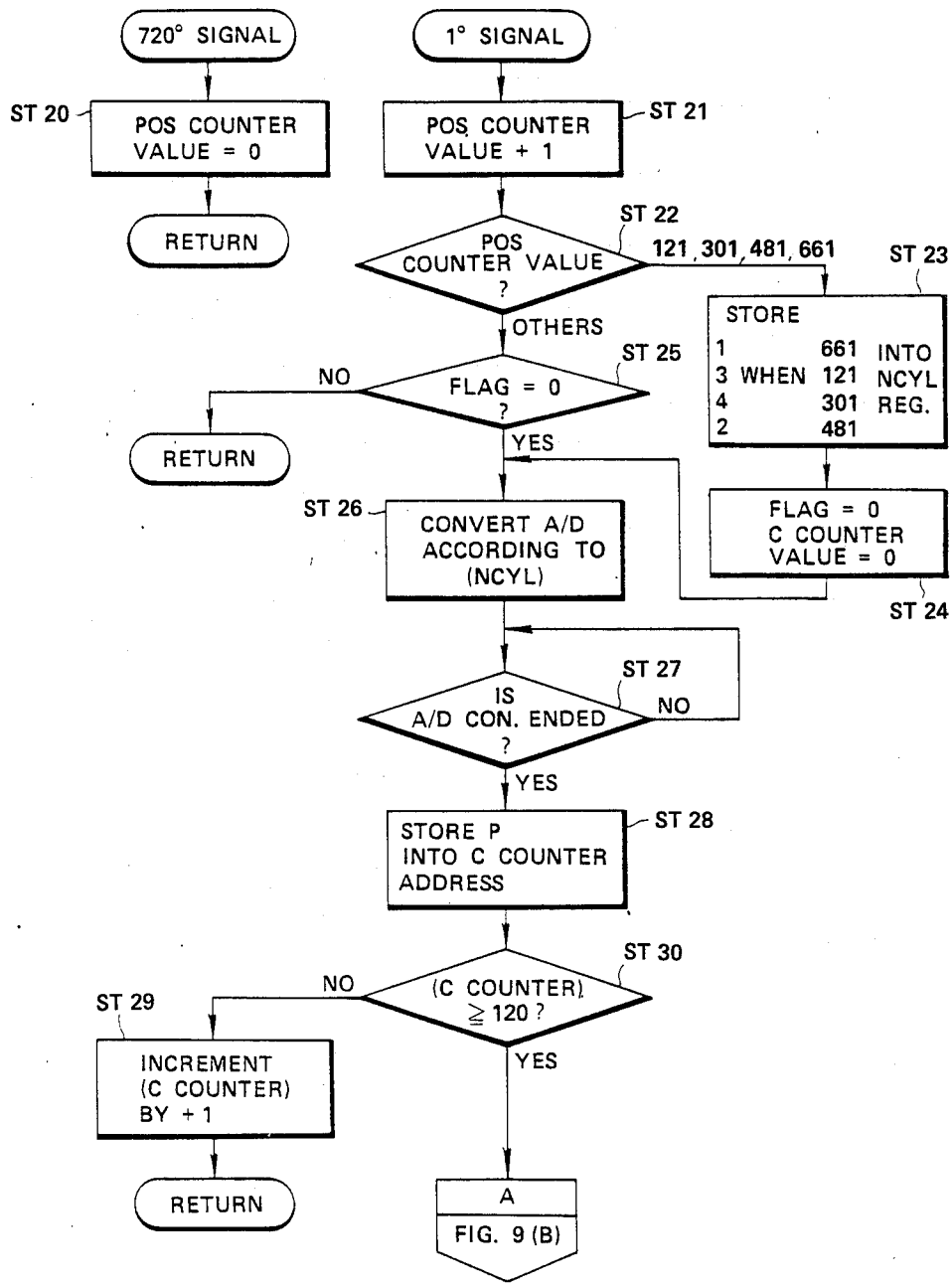
FIGS. 22(A) and 22(B) are integrally an operational flowchart on which a microcomputer executes for detecting a pseudo $P_i$ for each engine cylinder in the fifth preferred embodiment.
Figure 22B:
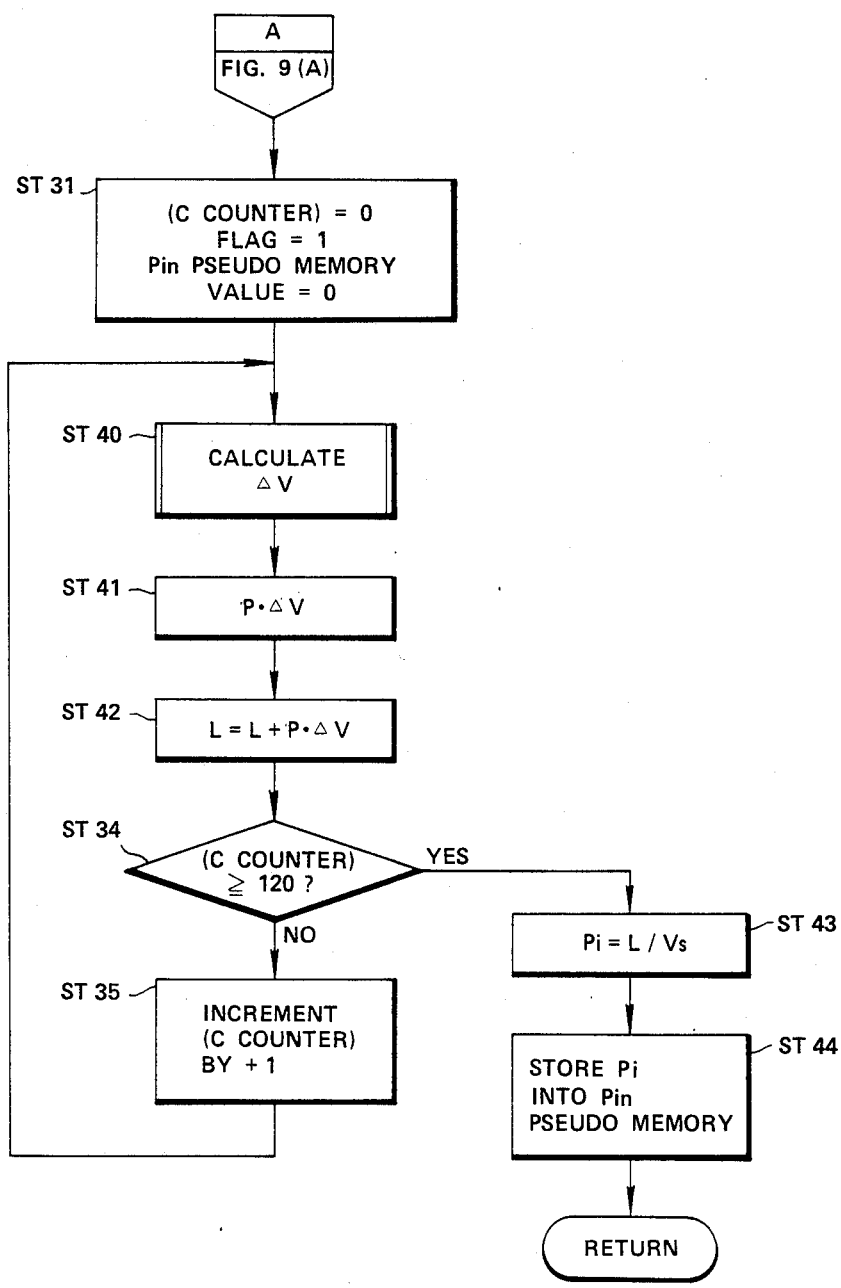
Figure 23A:
FIGS. 23(A) through 23(E) are signal timing charts for explaining circuit operations in the circuit shown in FIG. 21.
Figure 23B:
Figure 23C:
Figure 23D:
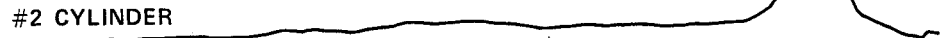
Figure 23E:
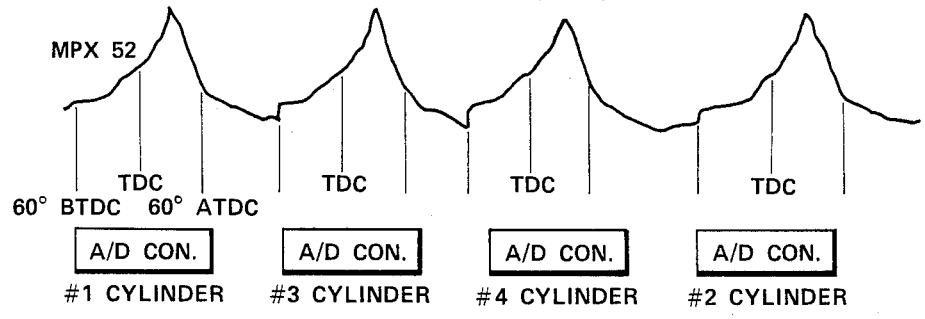

FIGS. 22(A) and 22(B) are integrally an operational flowchart on which the microcomputer is executed for detecting the pseudo value $P_i$ for each cylinder.

The two kinds of flowcharts shown in FIGS. 22(A) and 22(B) are executed whenever the 720° signal is ouputted and whenever the 1° signal is outputted, respectively. The 720° signal is based on a time at which the first cylinder reaches 60° before the top dead center of the first cylinder. The program based on the 720° signal has a priority than that based on the 1° signal.

The program synchronized with the 1° signal shown in FIGS. 22(A) and 22(B) is executed in a unit of 180° since the top dead center in the compression stroke for each cylinder of the fourth engine cylinder is reached whenever the crank angular displacement reaches 180°. In addition, since a crank angular displacement position at which the pseudo value $P_i$ is derived falls within ±60° with respect to the top dead center in the compression stroke of each cylinder, the pressure in each cylinder P is detected whenever the microcomputer receives the 1° signal within a range from 60° before the top dead center (60°BTDC) to 60° after the top dead center (60°ATDC). The microcomputer calculates $P \times \Delta V$ on the basis of the detected pressure value P. That is to say, the microcomputer detects the pressure P in steps ST21 through ST30 in FIG. 22(A) and derives the pseudo value $P_i$ in steps ST31 through ST44 in FIG. 22(B).

Specifically, since the crank angular displacement at 60° before the top dead center in the compression stoke of each cylinder is indicated when the POS count value of the POS counter 50 indicates 1, 181, 361, and 541, the flag FLAG is set to 0 to start the detection of P and the C counter 53 is cleared (steps ST22, ST24). Since the counting of the POS counter 50 is started on the rising edge of the 1° signal immediately after the reset signal (720° signal) is inputted, the POS counter 50 indicates a count value deviated by one at the crank angular displacement of 60° before the top dead center in the compression stroke.

It is noted that since the ignition order is 1st→3rd→4th→2nd as described above, it is possible to detect the crank angular displacement of 60° before the top dead center and simultaneously determine the cylinder number which is currently in the state of 60° before the top dead center in the compression stroke. When the POS count value of the POS counter 50 indicates 1, 181, 361, or 541, the cylinder number 1, 3, 4, or 2 is stored in the cylinder number register (NCYL register) so as to correspond to the indicated POS count value (step ST23).

After the crank angular displacement of 60°BTDC in the compression stroke of a particular cylinder is determined, a channel of the multiplexor 52 to connect to the A/D converter 54 is selected so that the A/D converter 54 receives the pressure indicative signal from the pressure-responsive sensor 23 installed on each cylinder, the A/D converter 54 carries out the analog-to-digital conversion, and the value P is stored in a register of the C counter address which corresponds to the count value of the C counter 53 as the data value (steps ST26 through ST28).

The storing operation of the value P is continued until 59° after the top dead center in the compression stroke and the microcomputer enters the calculation of the pseudo value $P_i$ (steps ST29 and ST30).

In a step ST31, the memory value $P_{in}$ of the pseudo $P_i$ memory 65A is once set to zero in order to calculate the pseudo value $P_i$.

In a step ST40, the value of ΔV is looked up from a table previously stored according to the value of the C counter 53. The value of ΔV takes a negative value before the top dead center in the compression stroke and takes a positive value after the top dead center in the compression stroke. In a step ST41, P×ΔV is calculated and in a step ST42 the value P×ΔV is accumulated. The accumulation is continued until the C ounter value indicates 120. When the C counter value indicates 120, the pseudo value $P_i$ is calculated in a step ST43. In a step ST44, the value $P_{in}$ (n=1 through 4) is stored in the memory location for the corresponding cylinder.

As described above, the microcomputer derives the pseudo value correlative to the indicated mean pressure value for each cylinder in a time sharing mode by detecting the cylinder pressure P in the vicinity of the top dead center in the compression stroke at which the work is most significant in one engine cycle.

That is to say, a minute work L(=P×ΔV) which is a multiplication of a minute change ΔV of a cylinder volume by the pressure value P is accumulated over a range by the predetermined angle (±60°) with respect to the top dead center in the compression stroke and a value of Σ(P×ΔV)/$V_s$, the accumulated value divided by the cylinder volume $V_s$ from the top dead center to the predetermined crank angle, is adopted as a value corresponding to the indicated mean effective pressure (steps ST40 through ST42, 34, and 43).

In this embodiment, the basic target value of the cylinder pressure to be compared must be a basic target value of the pseudo value $P_i$.

FIG. 26 shows an example of a table of the basic target value. The advantages of deriving the accumulated value ΣP×ΔV over the predetermined crank angle in the vicinity of the top dead center in the compression stroke and driving the pseudo value $P_i$ related to the indicated mean effective pressure will be described next.

FIGS. 23(A) through 23(E) show pressure-responsive sensor output signals of the first through fourth cylinders, an output signal of the multiplexor 52, and operation intervals of the A/D converter 54. In order to calculate an accurate pseudo value $P_i$, it is necessary to derive an integration $$\int_0^{720°} pdv$$

over the whole engine cycle. If the integration is calculated for each engine cylinder, it becomes necessary to provide the A/D converters, ΔV calculating blocks, multipliers, and accumulators for the respective cylinders. Consequently, the cost becomes high.

In this embodiment, the multiplexor (MPX) 52 provides a single series of the output signals from the pressure-responsive sensors and the single series of the output signals is processed by means of a couple of the A/D converter and ΔV calculating block and so on to reduce the cost.

In addition, although the pseudo value $P_i$ is calculated over the whole interval for the output signal of the multiplexor 52, a value closer to the real pseudo value $P_i$ can be derived. If the microcomputer is used to calculate the pseudo value $P_i$ from the whole interval of the output signal of the multiplexor 42, the engine cannot properly be controlled since there is no processing intervals for the ignition timing and for the air-fuel mixture ratio and so on. Therefore, the calculation of the pseudo value is carried out only for the interval during which the A/D conversion is carried out.

Figure 24:
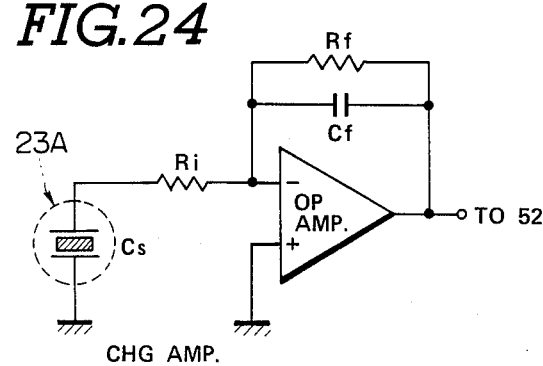
FIG. 24 is a detailed circuit construction of an electric charge amplifier used for converting an output signal from each pressure-responsive sensor 23 shown in FIG. 1 into a corresponding voltage signal.

Furthermore, since each pressure-responsive sensor 23 (in FIG. 24, the pressure-responsive sensor 23A for the first cylinder is shown) is constituted by the piezoelectric element, the charge amplifier CHG AMP. shown in FIG. 24 is used to convert an electric charge produced at the sensor into a corresponding voltage. The charge amplifier CHG AMP. has a function as a frequency filter.

Figure 25:
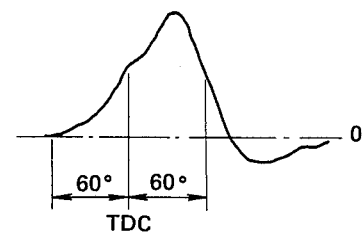
FIG. 25 is a specific output signal waveform of the electric charge amplifier.

FIG. 25 shows an output signal waveform of the charge amplifier shown in FIG. 24.

As shown in FIG. 25, the output signal of the charge amplifier has a differentiated part in which the signal level is dropped to a negative direction due to the frequency filtering characteristic. Therefore, if the integration described above is carried out including the differentiated part, the accuracy of the pseudo value $P_i$ becomes reduced. To avoid such a reduction of the accuracy, the integration over the limited range of the crank angular displacement is necessary. The cut-off frequency in the low frequency range of the charge amplifier is determined by the sensor capacitance $C_s$ and input resistance $R_i$ and the cut-off frequency in the high frequency range is determined by the feedback capacitor $C_f$ and feedback resistance $R_f$.

It should be noted that since the values of input resistance $R_i$, feedback resistance $R_f$, and feedback capacitance $C_f$ need to be determined properly for detecting such a high-frequency vibration as knocking vibration, such a differentiated output characteristic of the charge amplifier cannot be avoided when the charge amplifier having such a cost-reduced and simplified construction as shown in FIG. 24 is used.

Since as described above the engine control system and method according to the present invention detect a value correlative to the engine output, and controls the engine control parameter (preferably the opening angle of the throttle valve) correctively as the detection value being the feedback signal so that the detected value coincides the target value, the same engine output can always be produced at the same depression angle of the accelerator pedal without influence by the difference in the environment under which the engine is operated and by the aging effect. In addition, since the engine control system and method according to the present invention controls the engine output correctively in the vicinity of both limit value of the engine stable operation region with the detected value as the feedback signal, the same engine output can always be produced as described above and the fuel consumption can be suppressed at the minimum. Furthermore, since the engine control system controls the ignition timing at which the engine output is maximized with the detected value as the feedback signal, the same engine output can always be produced at the same depression angle of the accelerator pedal without influence by the above-described difference in the environment under which the engine is operated and by aging effect.

It will fully be understood by those skilled in the art that the detailed description is made in terms of preferred embodiments and various changes and modifications may be made without departing from the spirit and scope of the present invention which is to be difined by the appended claims.

What is claimed is:

1. A system for controlling an engine, comprising:
   (a) first means for adjusting an intake air quantity supplied to the engine according to an opening angle thereof;
   (b) second means for actuating said first means to adjust the opening angle according to an angular displacement thereof;
   (c) third means for defecting a pseudo value corresponding to an indicated mean effective pressure for each engine cylinder, the pseudo value being correlative to the engine output;
   (d) fourth means for detecting the angular displacement of said second means;
   (e) fifth means for detecting an engine speed;
   (f) sixth means for deriving a target value of the pseudo value from the angular displacement of said second means and engine speed detected by said fourth and fifth means;
   (g) seventh means for comparing the derived target value of the pseudo value by said sixth means with the detected value of pseudo value by said third means;
   (h) eighth means for calculating the opening angle value of said first means on the basis of a comparison result of said seventh means; and
   (i) ninth means for further actuating said first means to adjust the opening angle of said first means according to the calculated opening angle of said eighth means in addition to the adjustment of the opening angle of said first means by means of said second means so that the detected pseudo value by said third means coincides with the calculated target value thereof by said sixth means.

2. The system according to claim 1, wherein said third means comprises:
   (a) tenth means for detecting an internal pressure in each engine cylinder within a predetermined interval with respect to a top dead center in a compression stroke of the corresponding engine cylinder;
   (b) eleventh means for calculating a minute change in a cylinder volume of the corresponding cylinder;
   (c) twelfth means for calculating a multiplication of the internal pressure detected by said tenth means by the minute change in the cylinder volume calculated by said eleventh means;
   (d) thirteenth means for accumulating the calculated multiplication value by said twelfth means over the predetermined interval with respect to the top dead center; and
   (e) fourteenth means for dividing the accumulated multiplication value by said thirteenth means by another predetermined cylinder volume from the top dead center to a predetermined crank angular displacement so that the pseudo value corresponding to the indicated average mean effective pressure is detected for each cylinder.

3. The system according to claim 2, wherein said predetermined interval is 60 degrees in the crank angular displacement before and after the top dead center in the compression stroke.

4. The system according to claim 2, wherein said tenth means comprises: (a) a pressure-responsive sensor installed on each cylinder for detecting the pressure vibration in the corresponding cylinder and outputting an electric charge according to the pressure vibration; (b) a charge amplifier for converting the electric charge from said corresponding pressure-responsive sensor into a voltage signal; (c) a multiplexor for selectively outputting the voltage signal from said charge amplifiers; (d) an analog-to-digital converter for converting the output signal from the multiplexor into a digital value for each predetermined interval; and (e) fifteenth means for producing a signal to said multiplexor to select one of the voltage signals from the charge amplifiers whenever the predetermined interval is reached.

5. The system according to claim 1, which further comprises tenth means for storing the detected pseudo value into a predetermined memory area allocated to the corresponding cylinder so that said seventh means compares the derived target value of the pseudo value for the corresponding cylinder with the detected pseudo value for the corresponding cylinder stored in said tenth means.

6. A method for controlling an engine, comprising the steps of:
   (a) detecting a pseudo value corresponding to an indicated mean effective pressure for each cylinder and which correlative to an engine output;
   (b) detecting an angular displacement of an accelerator means according to which an opening angle of a throttle valve means located within a throttle chamber is varied;
   (c) detecting an engine speed;

(d) deriving a target value of the pseudo vaue correlative to the engine output from the detected angular displacement in said step (b) and detected engine speed in said step (c);
(e) comparing the calculated target value in said step (d) with the detected pseudo value correlative to the engine output in said step (a);
(f) calculating the opening angle value of the throttle valve means through which the throttle valve means is displaced so as to adjust an intake air quantity supplied to the engine on the basis of a comparison result in said step (e); and
(g) actuating the throttle valve means to adjust the opening angle of the throttle valve means according to the calculated opening angle of the throttle valve means in said step (f) so that the detected pseudo value correlative to the engine output in said step (a) coincides with the target value calculated in said step (f).

* * * * *